United States Patent
Jung et al.

(10) Patent No.: US 10,897,582 B2
(45) Date of Patent: Jan. 19, 2021

(54) MOBILE TERMINAL AND CONTROL METHOD THEREFOR

(71) Applicant: LG ELECTRONICS INC., Seoul (KR)

(72) Inventors: Byungwook Jung, Seoul (KR); Sangmin Shim, Seoul (KR); Sungbum Joo, Seoul (KR); Daeryuc Ryu, Seoul (KR); Jaekyung Ryu, Seoul (KR); Junghwan Jin, Seoul (KR); Gunshik Shin, Seoul (KR); Taewoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/334,218

(22) PCT Filed: Oct. 18, 2016

(86) PCT No.: PCT/KR2016/011707
§ 371 (c)(1),
(2) Date: Mar. 18, 2019

(87) PCT Pub. No.: WO2018/052159
PCT Pub. Date: Mar. 22, 2018

(65) Prior Publication Data
US 2019/0230293 A1     Jul. 25, 2019

(30) Foreign Application Priority Data

Sep. 19, 2016  (KR) .................. 10-2016-0119422

(51) Int. Cl.
*H04N 5/262*  (2006.01)
*H04N 5/225*  (2006.01)
(Continued)

(52) U.S. Cl.
CPC ............ *H04N 5/262* (2013.01); *G02B 15/12* (2013.01); *G06F 3/0482* (2013.01);
(Continued)

(58) Field of Classification Search
CPC .......... G02B 15/12; G06F 2203/04806; G06F 2203/04808; G06F 3/0482; G06F 3/04883;
(Continued)

(56) References Cited

U.S. PATENT DOCUMENTS

2012/0075489 A1*  3/2012  Nishihara .......... H04N 5/23296
                                                                348/222.1
2015/0009372 A1*  1/2015  Min .................... H04N 5/23212
                                                                348/262
(Continued)

FOREIGN PATENT DOCUMENTS

JP    2010-524279 A    7/2010
KR    10-0749337 B1    8/2007
(Continued)

*Primary Examiner* — Amy R Hsu
(74) *Attorney, Agent, or Firm* — Birch, Stewart, Kolasch & Birch, LLP

(57) ABSTRACT

A mobile terminal according to the present invention comprises: a main body; a camera provided in the main body and comprising first and second lenses, which have different telephoto ratios; and a control unit for correlating, on the basis of a specific subject, a first image captured through the first lens with a second image captured through the second lens, wherein the control unit correlates a first region of the first image, in which a first graphic object corresponding to the specific subject is included, with the second image including a second graphic object corresponding to the specific subject and, when a preset manner of touching is applied to the first region of the first image in a state in which the first image is outputted on a touch screen, controls the
(Continued)

touch screen such that the second image is outputted thereon.

17 Claims, 23 Drawing Sheets

(51) Int. Cl.
| | |
|---|---|
| *G06K 9/22* | (2006.01) |
| *H04M 1/02* | (2006.01) |
| *G06K 9/20* | (2006.01) |
| *G06K 9/00* | (2006.01) |
| *H04N 5/232* | (2006.01) |
| *G02B 15/12* | (2006.01) |
| *G06T 7/11* | (2017.01) |
| *G06T 7/246* | (2017.01) |
| *G06T 7/00* | (2017.01) |
| *G06F 3/0482* | (2013.01) |
| *G06F 3/0488* | (2013.01) |
| *G06K 9/62* | (2006.01) |

(52) U.S. Cl.
CPC ..... *G06F 3/04883* (2013.01); *G06K 9/00671* (2013.01); *G06K 9/2081* (2013.01); *G06K 9/22* (2013.01); *G06K 9/6211* (2013.01); *G06T 7/11* (2017.01); *G06T 7/246* (2017.01); *G06T 7/97* (2017.01); *H04M 1/02* (2013.01); *H04N 5/225* (2013.01); *H04N 5/232* (2013.01); *H04N 5/23212* (2013.01); *H04N 5/23296* (2013.01); *H04N 5/232933* (2018.08); *G06F 2203/04806* (2013.01); *G06F 2203/04808* (2013.01)

(58) Field of Classification Search
CPC .... G06K 9/00671; G06K 9/2081; G06K 9/22; G06K 9/6211; G06T 7/11; G06T 7/246; G06T 7/97; H04M 1/02; H04N 5/225; H04N 5/232; H04N 5/23216; H04N 5/23222; H04N 5/23238; H04N 5/23245; H04N 5/23258; H04N 5/23293; H04N 5/232933; H04N 5/232945; H04N 5/23296; H04N 5/262
See application file for complete search history.

(56) References Cited

U.S. PATENT DOCUMENTS

| | | | |
|---|---|---|---|
| 2016/0381282 A1* | 12/2016 | Bandlamudi | H04N 5/2628 348/240.3 |
| 2016/0381289 A1* | 12/2016 | Kim | G06T 7/285 348/38 |
| 2017/0041529 A1* | 2/2017 | Park | H04N 5/23296 |

FOREIGN PATENT DOCUMENTS

| | | |
|---|---|---|
| KR | 10-2016-0031886 A | 3/2016 |
| KR | 10-2016-0039453 A | 4/2016 |

\* cited by examiner (a)

(b)

MOBILE TERMINAL AND CONTROL METHOD THEREFOR

CROSS REFERENCE TO RELATED APPLICATIONS

This application is the National Phase of PCT/KR2016/011707 filed on Oct. 18, 2016, which claims priority under 35 U.S.C. § 119(a) to Patent Application No. 10-2016-0119422 filed in Korea on Sep. 19, 2016, all of which are hereby expressly incorporated by reference into the present application.

TECHNICAL FIELD

The present invention relates to a mobile terminal having a camera, and a control method therefor.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video through a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Meanwhile, in recent years, functions for improving performance of cameras provided in terminals have been actively developed as utilization of such cameras is increased. As one of these functional improvements, researches on methods of providing images of higher quality are being carried out in various aspects.

DETAILED DESCRIPTION OF THE DISCLOSURE

One aspect of the present invention is to provide a mobile terminal capable of providing images of high quality, and a control method thereof.

More specifically, the present invention relates to a mobile terminal capable of providing an enlarged image of high quality based on a request for enlarging at least part of a captured image.

According to an aspect of the present invention, there is provided a mobile terminal including a terminal body, a camera provided in the terminal body and including first and second lenses having different telephoto ratios, and a control unit to correlate a first image captured through the first lens and a second image captured through the second lens with each other, with respect to a specific subject, wherein the control unit may correlate a first region of the first image including a first graphic object corresponding to the specific object with a second image including a second graphic object corresponding to the specific object, and control the touch screen to output the second image when a preset touch is applied to the first region of the first image in a state where the first image is output on the touch screen.

In one embodiment, the first lens may be a lens having a telephoto ratio greater than or equal to 1, and the second lens may be a telephoto lens having a telephoto ratio smaller than 1.

In one embodiment, the control unit may extract the first and second images satisfying a common capturing condition among a plurality of images respectively captured through the first and second lenses, and determine a region of the first image, with which the second image is to be correlated, through a preset image matching process with respect to the first and second images.

In one embodiment, the common capturing condition may include a capturing place condition and a capturing time condition.

In one embodiment, the control unit may extract relative movement information related to the terminal body at a second time point with respect to a first time point by comparing posture information related to the terminal body at the first time point at which the first image has been captured with posture information related to the terminal body at a second time point at which the second image has been captured, and perform the first image matching process of determining the region of the first image, with which the second image is to be correlated, by use of the extracted relative movement information of the terminal body.

In one embodiment, the first region may be determined as a region located apart from a reference region of the first image by the relative movement information related to the terminal body, during the first image matching process.

In one embodiment, the control unit may extract feature points of at least one graphic object included in the first image and at least one graphic object included in the second image based on a preset algorithm, and perform a second image matching process of extracting the first and second graphic objects corresponding to the specific object from each of the first image and the second image by use of the extracted feature points.

In one embodiment, when the second image is captured through the second lens corresponding to the telephoto lens after the first image is captured, the control unit may perform the second image matching process and specifies, as the first region, a region of the first image which corresponds to the second graphic object included in the second image and includes the first graphic object.

In one embodiment, when an image capture request through the second lens corresponding to the telephoto lens is received after the first image is captured through the first lens, the control unit may output both the previously-captured first image and a preview image received through the second lens on the touch screen.

In one embodiment, a display size and a display position of the preview image received through the second lens may be determined according to a display position and a display size of the first graphic object, which corresponds to the specific subject to be captured through the second lens, in the first image.

In one embodiment, the preview image may be overlapped on the first region including the first graphic object in the first image.

In one embodiment, the image capture request through the second lens corresponding to the telephoto lens may be received in response to a preset touch being applied to one of at least one graphic object included in the first image output on the touch screen.

In one embodiment, the control unit may activate the second lens corresponding to the telephoto lens, in response to the preset touch, and control the camera so that the second lens is focused on a subject corresponding to the one graphic object to which the preset touch has been applied.

In one embodiment, when the first image is output on the touch screen in a state where the first region of the first image and the second image are correlated with each other, the control unit may control the touch screen to output a guide image indicating that the second image is correlated with the first region.

In one embodiment, the preset touch may be a pinch-in touch for enlarging a display size of the first image, and the control unit may gradually enlarge the display size of the first image according to the pinch-in touch, and control the touch screen to output the second image instead of the first image when an enlarged degree of the first image exceeds a preset reference.

In one embodiment, the control unit may control the touch screen to output the first image again when a pinch-out touch for reducing a display size of the second image is applied in a state where the second image is output in response to the pinch-in touch.

Effects of the Disclosure

As described above, according to a mobile terminal and a control method of the present invention, it is possible to capture images using a plurality of lenses having different telephoto ratios, and correlate the captured images with each other with respect to a specific subject. Therefore, images having different telephoto ratios for the specific object can be provided.

In addition, one of a plurality of lenses having different telephoto ratios has a telephoto ratio of 1 or less, and thus can acquire an enlarged image for a specific subject. Therefore, in a mobile terminal and a control method thereof according to the present invention, an enlarged image for a subject corresponding to a portion selected by a user in an image captured through a lens having a telephoto ratio of 1 or more can be provided as the image captured through the lens having the telephoto ratio of 1 or more, which may allow the user to acquire an enlarged image with high quality with respect to the specific subject.

BEST MODE FOR CARRYING OUT PREFERRED EMBODIMENTS

Figure 1A:
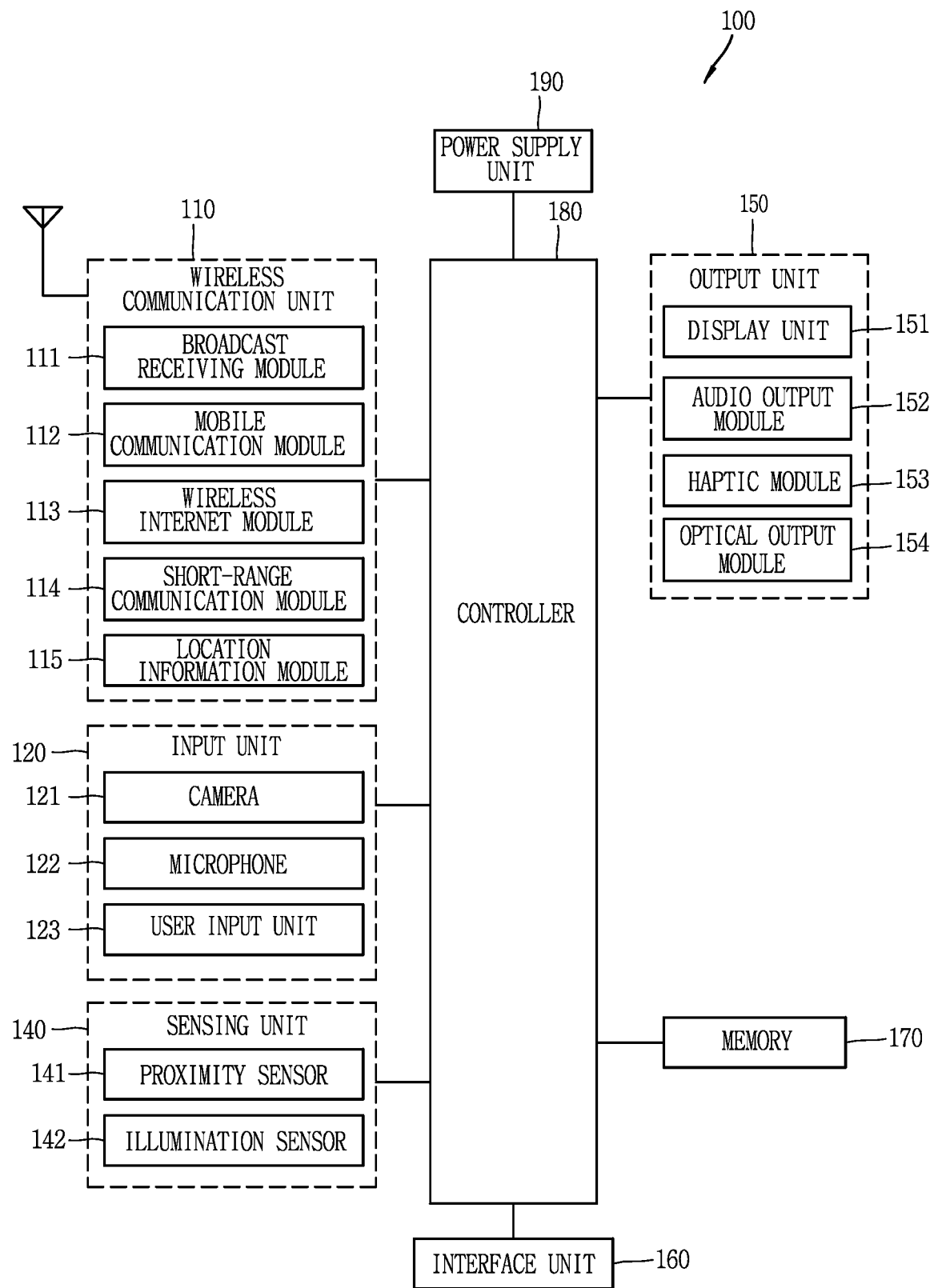
FIG. 1A is a block diagram of a mobile terminal in accordance with one embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
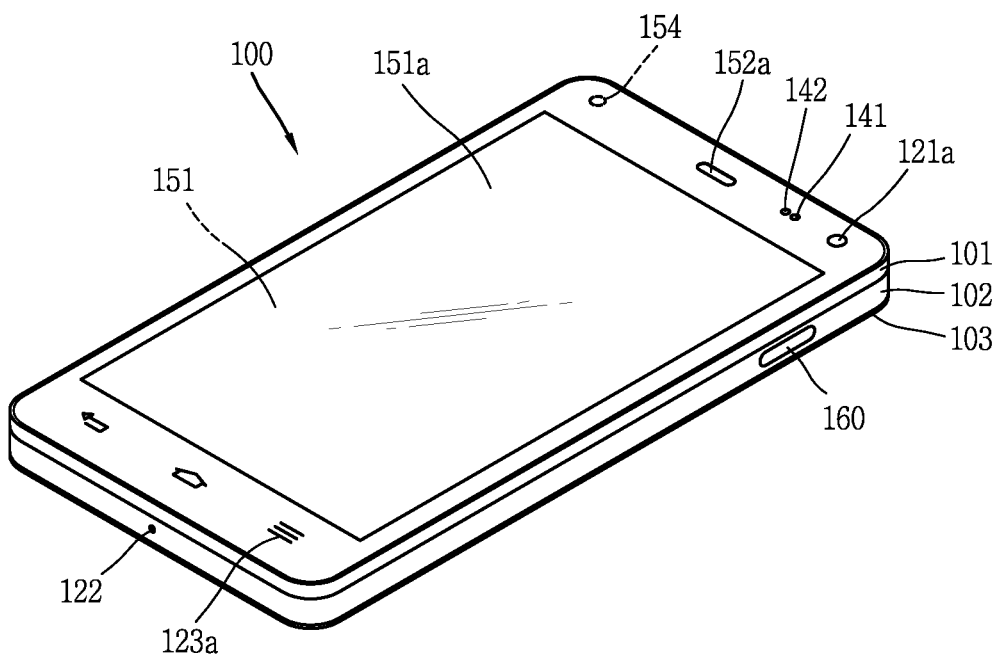
FIGS. 1B and 1C are conceptual views illustrating one example of a mobile terminal according to the present invention, viewed from different directions.
Figure 1C:
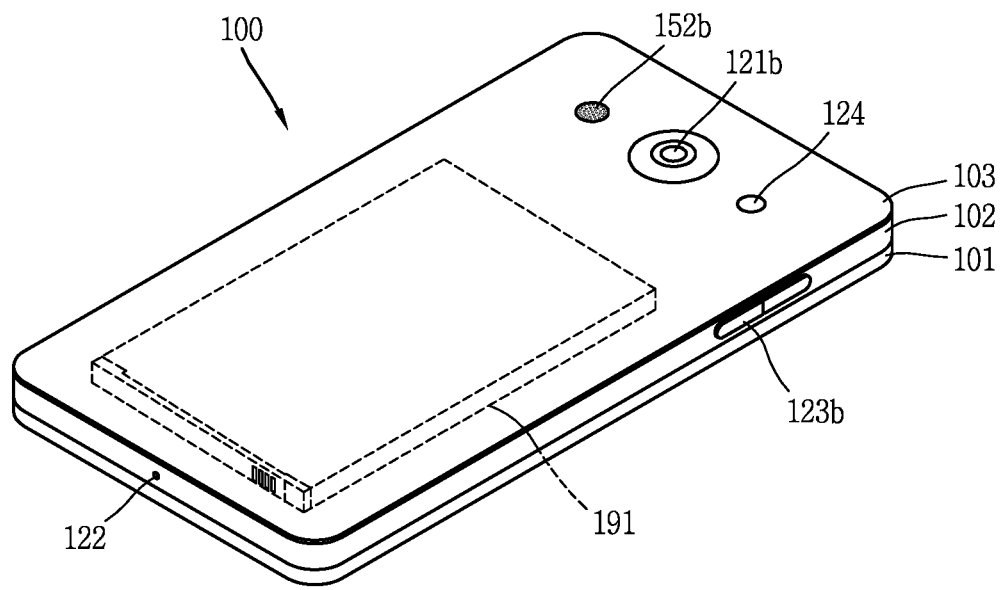

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or to receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit is internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152*a*, the proximity sensor 141, the illumination sensor 142, the optical output module 154, the first camera 121*a*, and the first manipulation unit 123*a*, the side surface of the terminal body is shown having the second manipulation unit 123*b*, the microphone 122, and the interface unit 160, and the rear surface of the terminal body is shown having the second audio output module 152*b* and the second camera 121*b*.

However, those components may not be limited to the arrangement. Some components may be omitted or rearranged or located on different surfaces. For example, the first manipulation unit 123*a* may be located on another surface of the terminal body, and the second audio output module 152*b* may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151*a* and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Meanwhile, as described above, the mobile terminal according to the present invention may include a camera on at least one of the front surface and the rear surface of the terminal body.

Furthermore, the mobile terminal according to the present invention may have at least two cameras.

Of the at least two cameras, a first lens provided in a first camera and a second lens provided in a second camera may have different telephoto ratios from each other. The first lens may be a lens having a telephoto ratio greater than or equal to 1, and the second lens may be a telephoto lens having a telephoto lens smaller than 1. In particular, the first lens may be a lens having a telephoto ratio capable of capturing a wide-angle image. That is, the first lens may be a wide-angle lens.

In the mobile terminal according to the present invention, images having different telephoto ratios with respect to a specific subject to be captured can be provided by correlating (associating) images captured through the lenses having the different telephoto ratios. Particularly, in the present invention, an image for a specific subject captured through a telephoto lens is provided, so that the user can acquire an enlarged and high-resolution image for the specific subject. In the related art, enlargement for an image captured through a single lens is performed based on a user request. As a result, when the user desires to view an enlarged image for a specific subject, resolution of the image is lowered.

Thus, in order to solve such a problem, the present invention can provide the user with a high-resolution image with respect to a specific subject, in a manner of capturing the image of the specific subject through a wide-angle lens.

On the other hand, lenses having different telephoto ratios may be provided together in the terminal body of the mobile terminal. Alternatively, lenses having different telephoto ratios may be provided in separate devices or apparatuses. Such separate devices may be configured to transmit or receive images from one to another by mutual communication through wireless communication or wired communication. In this case, the mobile terminal may receive images captured by at least one another device, and perform a process of correlating the received images with images captured by the mobile terminal, with respect to a specific subject. On the other hand, in the mobile terminal according to the present invention, only images received from other devices can be correlated with respect to a specific subject even if there are no images captured by the terminal itself.

Therefore, in the following description, it is not necessary to distinguish where the first and second lenses are provided, and embodiments according to the following description may be equally applied to all of the cases where the first and second lenses are provided together in the terminal body, ii) provided in the terminal body and another device, respectively, iii) provided in different devices, respectively, and iv) provided together in another device.

Hereinafter, description will be given of a method of correlating an image captured through a first lens with an image captured through a second lens, with respect to a specific subject, a method of guiding image capturing through different lenses, and a method of providing a user with images captured through different lenses.

Figure 2:
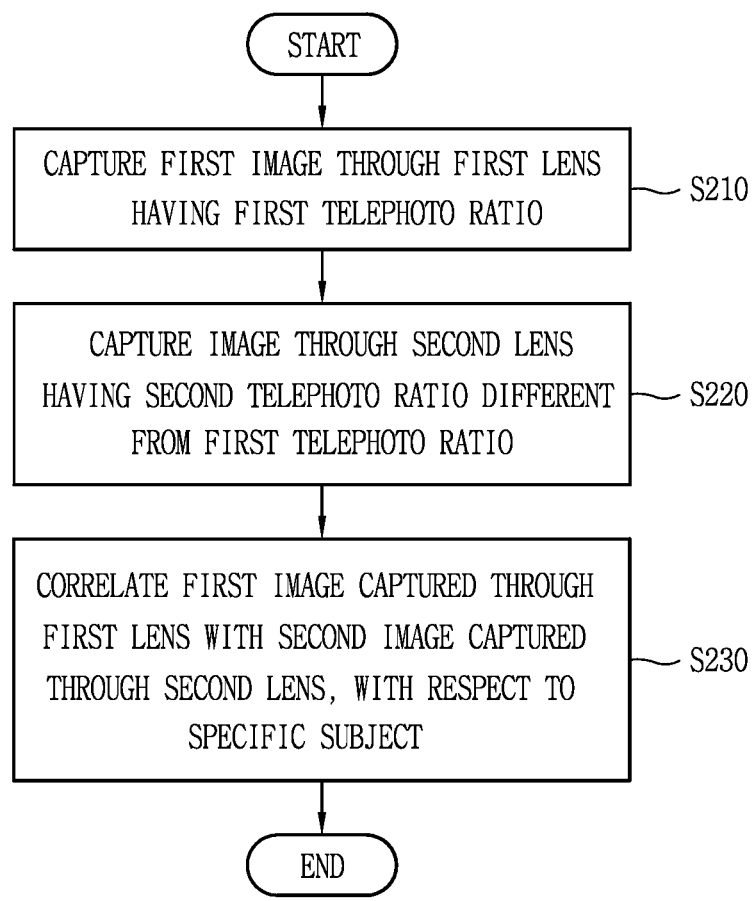
FIG. 2 is a flowchart illustrating a method of capturing images through lenses having different telephoto ratios according to the present invention.
Figure 3:
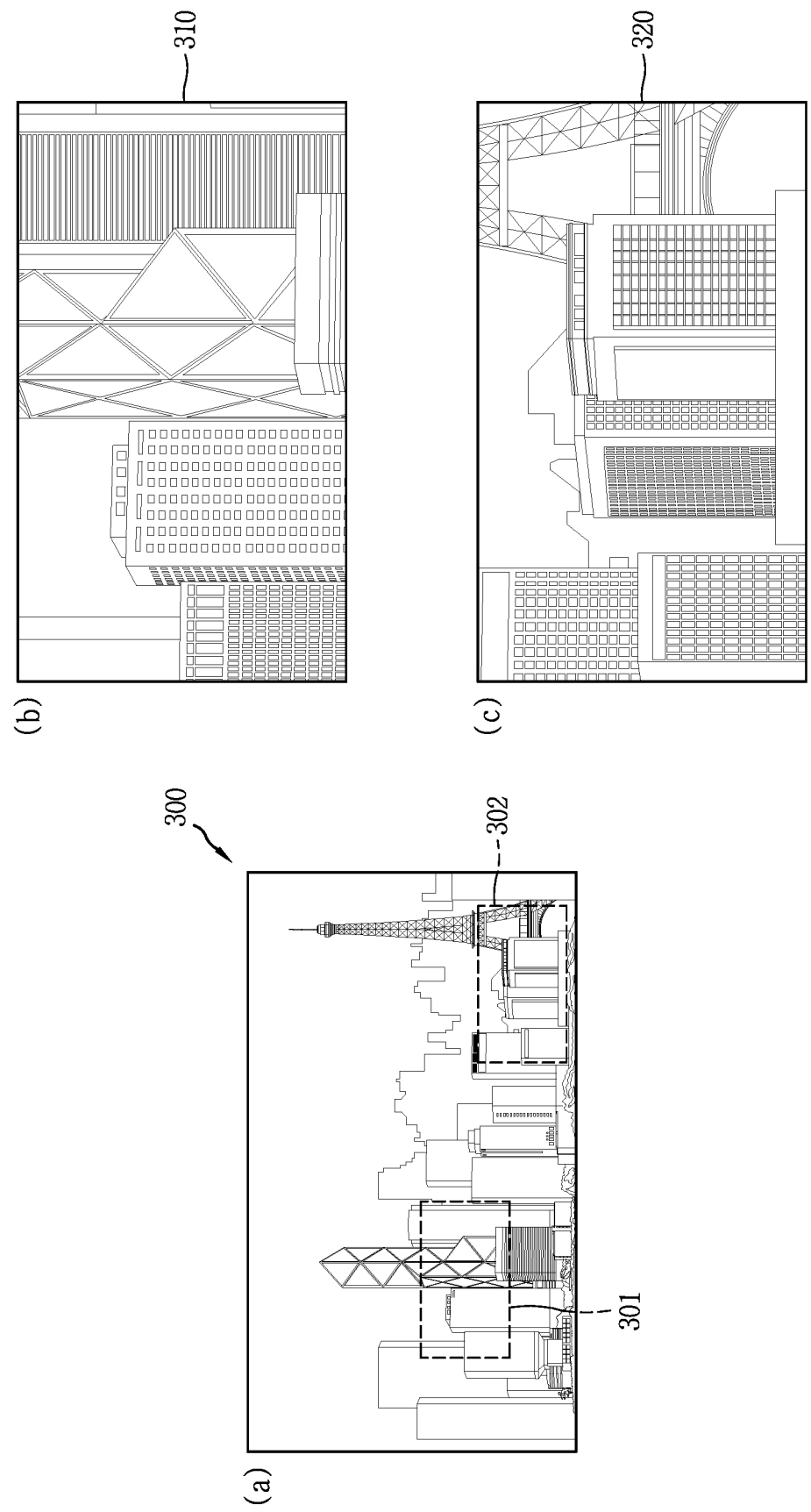
FIG. 3 is a conceptual view illustrating the control method illustrated in FIG. 2.

First, a method of correlating different images with respect to a specific subject will be described in detail with reference to the accompanying drawings. FIG. 2 is a flowchart illustrating a method of capturing images through lenses having different telephoto ratios according to the present invention, FIG. 3 is a conceptual view illustrating the control method illustrated in FIG. 2, and FIGS. 4, 5A, and 5B are conceptual views illustrating a method of correlating images captured through lenses having different telephoto ratios with each other.

First, in a mobile terminal according to the present invention, a first image is captured through a first lens having a first telephoto ratio (S210), and a second image is captured through a second lens having a second telephoto ratio different from the first telephoto ratio (S220).

As aforementioned, the first lens may be a lens having a telephoto ratio greater than or equal to 1, and the second lens may be a telephoto lens having a telephoto ratio smaller than 1.

On the other hand, the first image and the second image may be captured at different time points, or captured at the same time. Which one of the first and second images is to be captured first or whether both the first and second images are to be captured simultaneously may be decided based on the user's selection.

The first and second lenses capture at least one subject. In the present invention, when at least one of subjects to be captured through the first lens is the same as (or similar to) a subject to be captured through the second lens, the first and second images may be correlated with each other.

That is, in the present invention, the first image captured through the first lens and the second image captured through the second lens are correlated with each other with respect to a specific subject (S230).

More specifically, the control unit (or controller) 180 may correlate a first region including a first graphic object corresponding to a specific subject to be captured through the first lens with a second image including a second graphic object corresponding to the specific subject.

For example, it is assumed that a first image 300 has been captured through the first lens as illustrated in (a) of FIG. 3, and second images 310 and 320 have been captured through the second lens as illustrated in (b) and (c) of FIG. 3.

As illustrated, parts 301 and 302 of a specific subject (e.g., parts of a specific building) in the first image 300 captured through the first lens are the same as the specific subject included in the second images 310 and 320 captured through the second lens.

In this way, when the same subject is captured through the first and second lens, the control unit 180 correlates the first image 300 captured through the first lens with the second images 310 and 320 captured through the second lens. And the user can be provided with the second images 310 and 320 together with the first image 300 based on a user request or the control of the control unit 180.

As described above, the second lens is a telephoto lens. Thus, when the first and second lenses perform capturing with respect to the same subject, the images 310 and 320 captured through the second lens may be enlarged images of parts of the image 300 captured through the first lens. Furthermore, since the second lens is a telephoto lens and is driven independently of the first lens, the second lens has inherent resolution without being affected by resolution of the image captured through the first lens.

Accordingly, the second images 310 and 320 captured through the second lens can be provided as enlarged images of the first image 300, with the resolution inherent to the second lens. Thus, the user can be provided with enlarged images having high resolution.

As illustrated in (a) and (b) of FIG. 3, the control unit 180 correlates a first region 301 including a first graphic object corresponding to a specific subject of the first image 300 with the second image 310 including a second graphic object corresponding to the specific subject.

Likewise, when another second image is present, as illustrated in (a) and (c) of FIG. 3, the control unit 180 correlates a second region 302 including a third graphic object corresponding to another specific subject of the first image 300 with the another second image 320 including a fourth graphic object corresponding to the specific subject.

After the correlation of the first and second images 300, 310 and 320 is completed, when a preset touch is applied to the first region 301, the control unit 180 may control the touch screen 151 to output the second image 310 or 320.

Meanwhile, the control unit 180 may also extract only a specific graphic object from the second image and correlate only an image of the extracted portion with the first image. Here, the specific graphic object may be specified by the user's selection or under the control of the control unit 180. The control unit 180 may specify a specific graphic object in a variety of ways. For example, the control unit 180 may specify a graphic object, which occupies the greatest area among graphic objects included in the second image, as the specific graphic object.

When the graphic object is specified in the second image, the control unit 180 may delete the remaining portion of the second image except for the specified graphic object, and then correlate the second image with the first image.

As described above, one of a plurality of lenses having different telephoto ratios has a telephoto ratio of 1 or less, and thus can acquire an enlarged image for a specific subject, as compared with capturing through a general lens. Therefore, in a mobile terminal and a control method thereof according to the present invention, an enlarged image for a subject corresponding to a portion, which is selected by a user from an image captured through a lens having a telephoto ratio of 1 or more, can be provided as the image captured through the lens having the telephoto ratio of 1 or more. This may allow the user to acquire an enlarged image with high quality with respect to a specific subject.

Hereinafter, description will be given in more detail of a method of correlating an image captured through a first lens with an image captured through a second lens when the first lens and the second lens have performed capturing with respect to the same subject.

Figure 4:
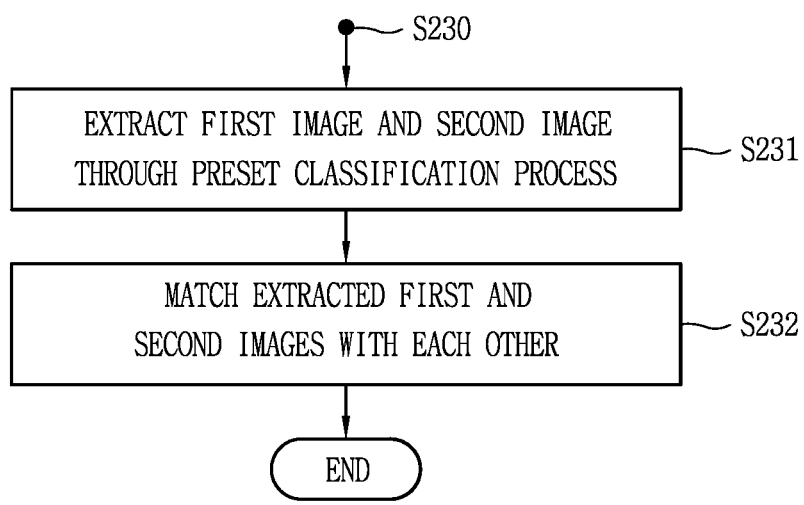
FIGS. 4, 5A, and 5B are conceptual views illustrating a method of correlating images captured through lenses having different telephoto ratios with each other.

First, as illustrated in FIG. 4, the control unit 180 extracts a first image captured through the first lens and a second image captured through the second lens, with respect to the same subject, through a preset classification process (S231).

More specifically, the control unit 180 extracts the first and second images, which satisfy a common capturing condition, from a plurality of images captured through the first and second lenses, respectively. Here, the common capturing condition may include a capturing place condition and a capturing time condition.

That is, the control unit 180 may extract, through a primary classification, correlated images among a plurality of images captured through the first and second lenses under a capturing condition based on at least one of a capturing space and a capturing time. That is, it is because images satisfying the common capturing condition are highly likely to be images captured with respect to the same or similar subject.

In this way, when the first and second images are extracted through the primary classification, the control unit 180 matches the extracted first and second images with each other (S232).

The control unit 180 may determine a region of the first image which is to be correlated with the second image, through a preset image matching process for the extracted first and second images.

That is, the control unit 180 may match the first and second images so that a graphic object included in one region of the first image and a graphic object included in the second image correlated with the one region are all for the same object.

The process of matching the first and second images may be understood as a process of finding which part of the first image corresponds to the second image.

On the other hand, there may be a plurality of algorithms for matching the first and second images, and the mobile terminal according to the present invention may use at least one of the plurality of matching algorithms.

First, a first matching method is configured to compare posture information related to the terminal body when the first image has been captured with posture information related to the terminal body when the second image has been captured, and finding one region based on relative movement information related to the terminal body.

The control unit may sense at least one of posture information and position information related to the terminal body using at least one sensor provided in the terminal at the time of capturing the first and second images. The control unit 180 may use position sensor information, and at least one of an accelerometer, a gyro sensor, and a magnetic sensor may be utilized as the position sensor.

More specifically, according to the first matching method, the control unit 180 extracts relative movement information related to the terminal body at a second time point with respect to a first time point by comparing posture information related to the terminal body at the first time point at which the first image has been captured with posture information related to the terminal body at a second time point at which the second image has been captured.

Then, by using the extracted relative movement information of the terminal body, the first image matching method may be performed to determine a region of the first image with which the second image is to be correlated.

The control unit 180 may determine a region, which is located apart from a reference region (or reference point) of the first image by the relative movement information of the terminal body, as the first region. The control unit 180 may calculate an offset with respect to how far or much the terminal body has moved in a three-dimensional space when the first and second images have been captured, based on the relative movement information. The control unit 180 may then determine, based on the calculated offset, a region of the first image with which the second image is to be correlated.

Figure 5A:
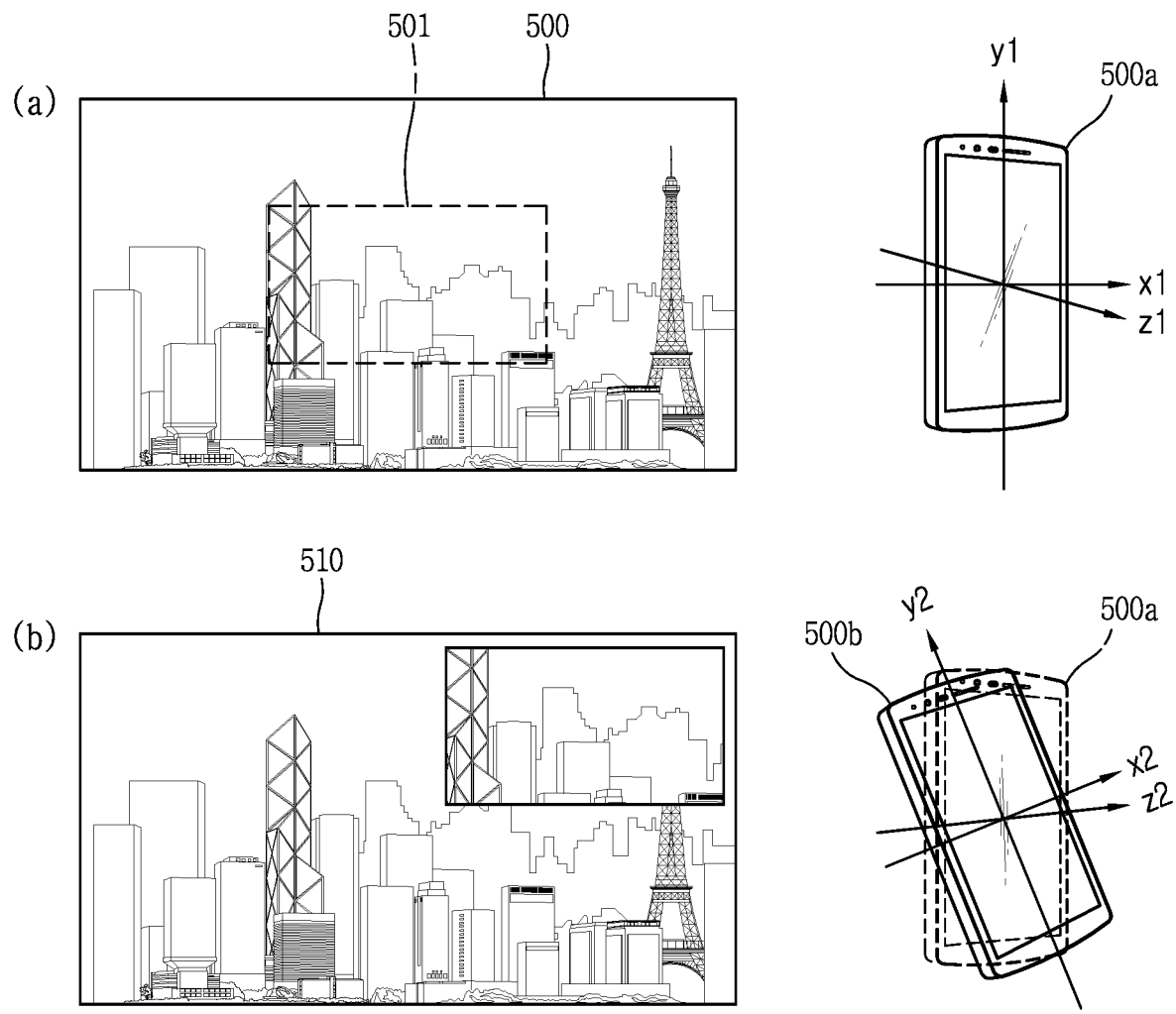

For example, as illustrated in (a) of FIG. 5A, the control unit 180 may extract a relative movement of the terminal body, by way of comparing posture information (x1, y1, z1) related to the terminal body 100 when a first image 500 has been captured with posture information (x2, y2, z1) related to the terminal body 100 when a second image 501 has been captured.

Here, the relative movement of the terminal body is also defined based on a rotational movement according to roll, pitch and yaw directions with x, y, and z axes as rotation axes, respectively.

When the relative movement of the terminal body is calculated by the first matching method, the control unit 180 may determine a region, which is located apart from a reference region (or reference point) of the first image by the extracted relative movement information (relative movement amount) related to the terminal body, as a first region which is a region corresponding to the second image.

At this time, the control unit 180 may finally determine the relative movement (or the relative movement information) of the terminal body in consideration of physical arrangement positions of the first lens and the second lens.

As described above, the control unit 180 may calculate how much the terminal body has been moved in the 3D space when the first and second images have been captured, and specify a portion of the first image corresponding to the second image by reflecting the movement of the terminal body.

Next, a second matching method is a method of extracting feature points from the first image and the second image to identify portions each including a graphic object corresponding to a specific object.

Figure 5B:
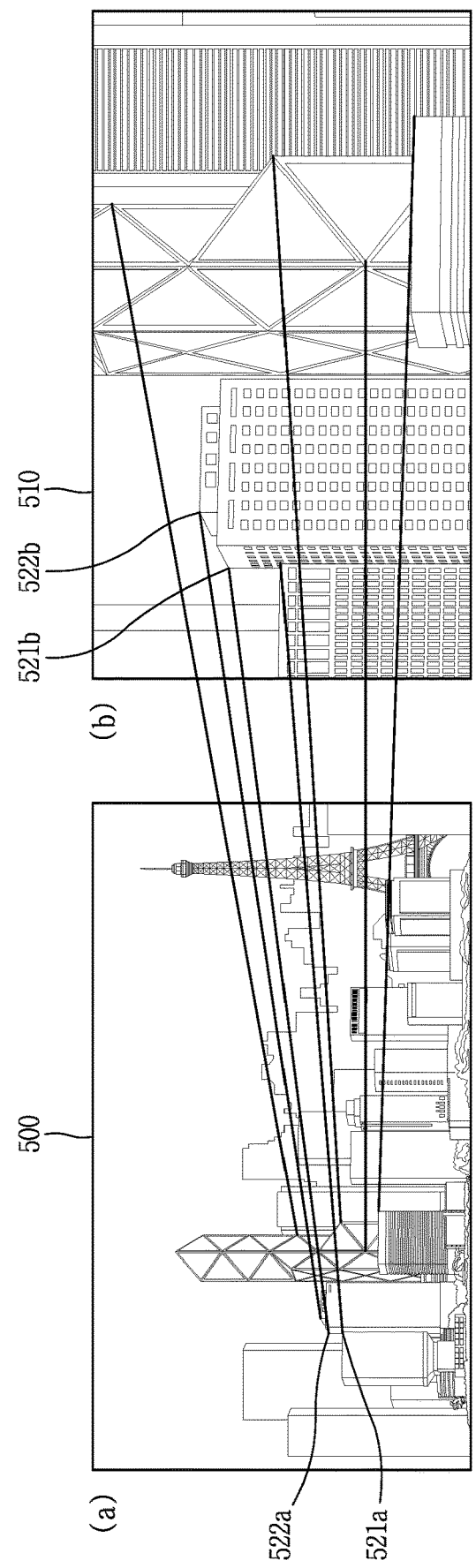

The control unit 180, as illustrated in (a) of FIG. 5B, may extract feature points 521a, 521b, 522a, and 522b for at least one graphic object included in the first image 500 and at least one graphic object included in the second image 510 based on a preset algorithm, and identify portions including a specific subject in the respective first and second images 500 and 510 using the extracted feature points.

The control unit 180 may correlate a first graphic object corresponding to the specific subject in the first image 500 with a second graphic object corresponding to the specific subject in the second image 510 by using the feature point extraction method.

In this case, a first region, which is correlated with the second image (particularly, a region including the second graphic object), in the first image may be a region including the first graphic object.

That is, when the first image is captured and then the second image is captured through the second lens corresponding to the telephoto lens, the control unit 180 may perform the second image matching process, and specify a region, which corresponds to the second graphic object included in the second image and includes the first graphic object in the first image, as the first region.

On the other hand, the feature point extraction method may be various, and is not limited to a specific method in this specification. That is, the control unit may extract feature points from the first and second images using at least one of various feature point extraction algorithms, match the two images based on the extracted feature points, find correlated portions from the two images, and then match the correlated portions with each other.

Examples of the feature point extraction method may include i) Scale Invariant Feature Transform (SIFT) algorithm, ii) Histogram of Oriented Gradient (HOG) algorithm, and iii) Local Binary Pattern (LBP) algorithm.

In addition, examples of the method of matching two images with each other using the extracted feature points may include i) Template Matching, ii) Relational matching, and iii) Feature matching algorithms.

Meanwhile, the control unit 180 according to the present invention may correlate the first and second images using at least one of the matching processes according to the first and second methods described above.

Meanwhile, the control unit may also correlate the first and second images by performing only one of the processes S231 and S232.

In the mobile terminal and the control method thereof according to the present invention as described above, images can be captured using a plurality of lenses having different telephoto ratios and correlating the captured images based on a specific subject. Therefore, images having different telephoto ratios for the specific object can be provided.

In addition, one of a plurality of lenses having different telephoto ratios has a telephoto ratio of 1 or less, and thus can acquire an enlarged image for a specific subject. Therefore, in the mobile terminal and the control method thereof according to the present invention, an enlarged image for a subject corresponding to a portion selected by a user from an image captured through a lens having a telephoto ratio of 1 or more can be provided as the image captured through the lens having the telephoto ratio of 1 or more, which may allow the user to acquire an enlarged image with high quality with respect to the specific subject.

Hereinafter, description will be given of a user scenario based on the method of correlating the first and second images discussed above.

First, a method of capturing first and second images will be described in detail with reference to the accompanying drawings. FIGS. 6A, 6B, 6C, 6D, 7A, 7B, 7C, 7D, 8A and 8B are conceptual views illustrating a method of capturing images through lenses having different telephoto ratios.

In the mobile terminal according to the present invention, a request for capturing a first image (first image capture request) through a first lens and a request for capturing a second image (second image capture request) through a second lens may be made in various ways. The control unit 180 may separately receive the first image capture request and the second image capture request.

For example, an image capture request may be received while a camera function application is executed. The image capture request may be a touch input applied to an icon with which an image capture command is linked (or associated), or a reception of a voice command corresponding to image capturing. Also, the image capture request may be received as a physical force is applied to a hardware touch key or push key linked with an image capture command. On the other hand, the image capture request may be received even while the camera function application is not being executed, and the camera function application may be executed after the image capture command is received.

When the first image capture request and the second image capture request are received independently of each other, the control unit 180 may correlate the first and second images through the various image matching methods (algorithms or processes) described above.

Further, in the mobile terminal according to the present invention, capturing for the second image may be processed in association with capturing of the first image.

Figure 6A:
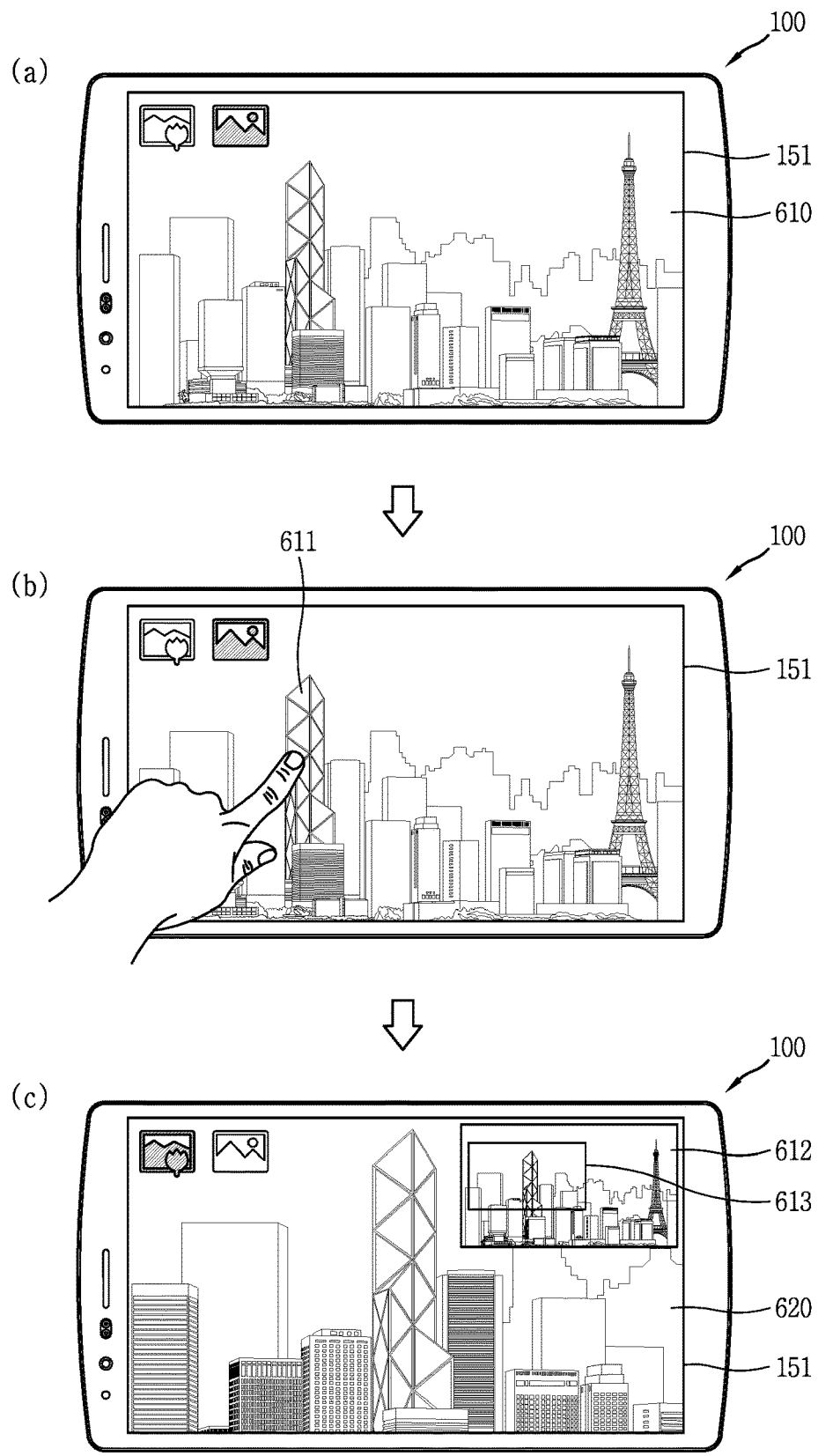
FIGS. 6A, 6B, 6C, 6D, 7A, 7B, 7C, 7D, 8A and 8B are conceptual views illustrating a method of capturing images through lenses having different telephoto ratios.
Figure 6B:
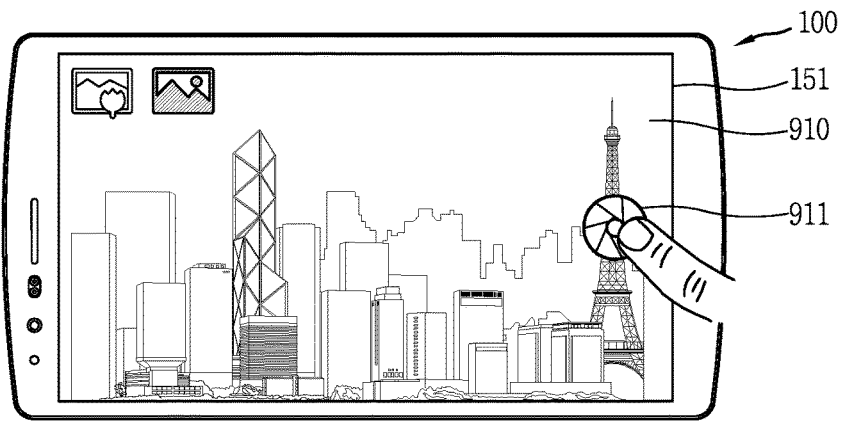
Figure 6B:
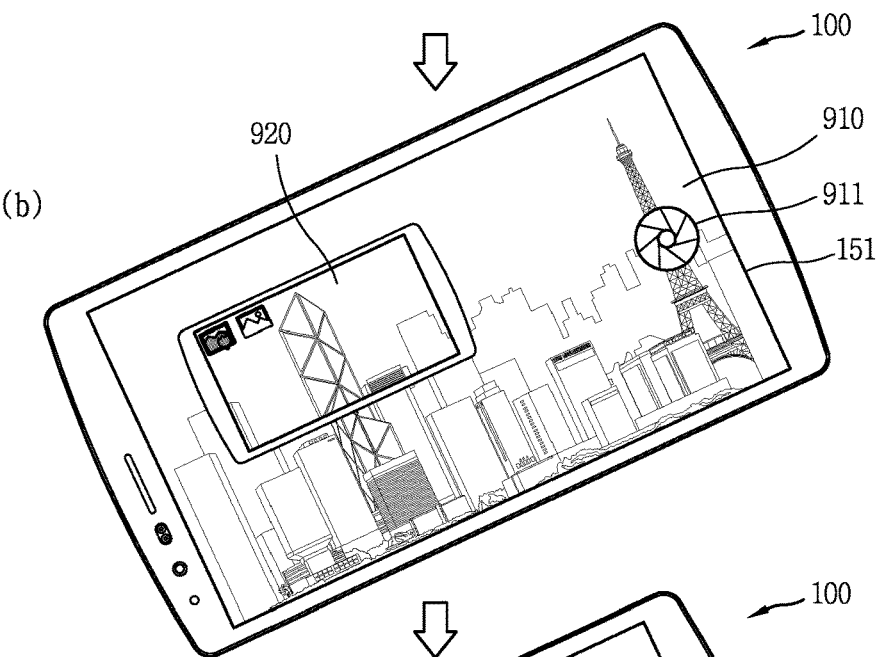
Figure 6B:
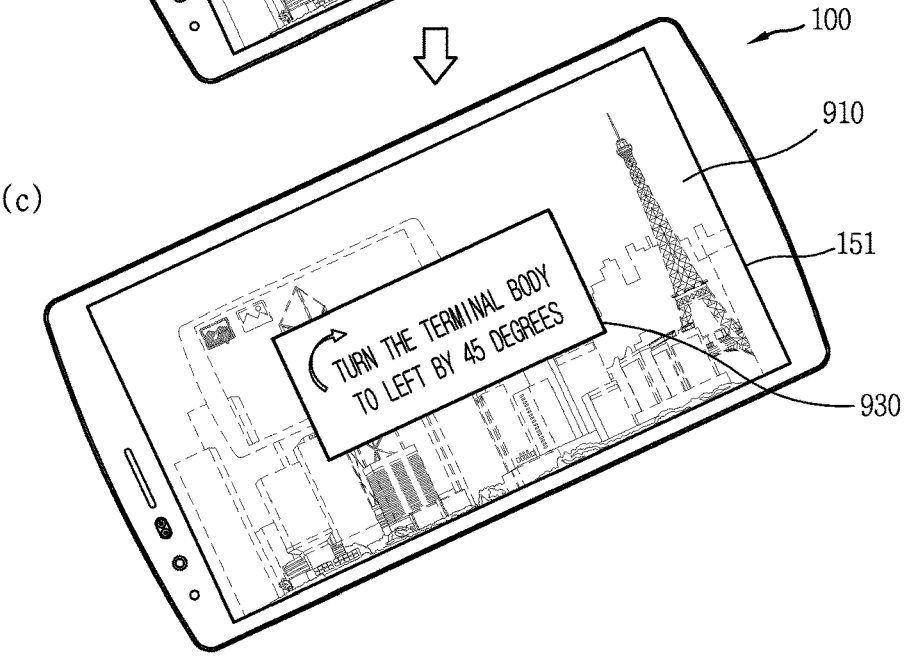

For example, as illustrated in (a) of FIG. 6A, when a first image 610 is captured through a first lens and then the captured first image 610 is output on the touch screen 151, the control unit 180 may capture a second image through a second lens, in response to a preset touch applied to the first image 610 output on the touch screen 151.

When a preset touch (e.g., a long touch, a double touch, etc.) is applied to the first image 610, as illustrated in (a) and (b) of FIG. 6A, the control unit 180 may recognize it as a capture request using the second lens. In response to the capture request through the second lens, the control unit 180 may activate the second lens. As illustrated in (c) of FIG. 6A, a preview image received through the second lens may be output on the touch screen.

On the other hand, the control unit 180 may specify a subject to be captured through the second lens in the first image 610, based on a point to which the preset touch has been applied. That is, the subject to be captured to through the second lens may be specified according to what graphic object is being output on a point to which the preset touch has been applied.

As illustrated in (a) and (b) of FIG. 6A, when a preset touch is applied to a specific graphic object 611 (for example, a graphic object corresponding to a specific building), the control unit 180 may specify a subject corresponding to the specific graphic object 611 as a subject to be captured through the second lens.

In this case, responsive to the subject being specified, the control unit 180 may adjust a focus of the second lens or the like with respect to the specified subject, so that the specified subject can be captured through the second lens.

On the other hand, as illustrated in (c) of FIG. 6A, a preview image, which is received through the second image, may be output on the touch screen 151. At this time, an image (e.g., thumbnail image 612) corresponding to the first image 610 may be output together on one region of the touch screen.

In this case, the thumbnail image 612 may be output together with information related to which portion of the first image 610 the preview image output on the touch screen 151 corresponds to. The control unit 180, as illustrated, may provide information related to which portion of the first image 610 corresponds to a portion being captured through the second lens, by utilizing a guide image 613 or a graphic object.

At this time, when the portion being captured through the second lens (or the preview image being received through the second lens) is changed, that is, when a view of the second lens is changed, an output position of the guide image 613 can be changed.

In this way, when an image capture request is received through the second lens corresponding to the telephoto lens, the control unit 180 may output both the first image 610 or the thumbnail image 612 corresponding to the first image and a preview image 620 received through the second lens.

On the other hand, when the user specifies a subject to be captured through the second lens, the control unit 180 may correlate the first and second images with respect to the specified subject and a graphic object corresponding to the subject when the first and second images are correlated with each other.

Further, when capturing the first image 610, the control unit 180 may collect posture information and position information related to the terminal body. Accordingly, the control unit 180 may recognize where the specified subject is located based on the collected information. When the terminal body is currently disposed at a position or posture which is inappropriate for capturing the specified subject, as illustrated in (c) of FIG. 6B, the control unit 180 may output guide information 930, so as to guide the terminal body to be located at a physical position at which the specified subject can be captured.

Further, the control unit 180 may compare a posture of the terminal body when the first image 610 has been captured with a posture of the terminal body when performing capturing through the second lens. When the two postures are different from each other, the control unit 180 may output guide information related to the posture of the terminal body so that the posture of the terminal body when the first image 610 has been captured and the current posture of the terminal body can be the same as or similar to each other.

The posture of the terminal body may be collected through various sensors provided in the terminal body at the time of capturing images, and may also be collected in real time or at predetermined intervals when the camera is activated.

Further, when the postures of the terminal body at the time of capturing the first and second images are different from each other, for example, the control unit 180 may edit at least one of the first and second images to provide a visual effect as if the two images have been captured at the same posture.

For example, the control unit 180 may edit the second image based on the posture of the terminal body at the time point when the first image has been captured. For example, when the terminal body at the time of capturing the second image has rotated by a predetermined angle, relative to the posture of the terminal body at the time of capturing the first image, the control unit 180 may edit the second image in a manner of rotating the second image in an opposite direction to a rotated direction of the terminal body by the predetermined angle.

At this time, if the second image is not in a rectangular shape due to the rotation, the control unit 180 may fill empty portions made due to the rotation by using at least one of at least part of the first image and at least part of the second image.

Figure 6C:
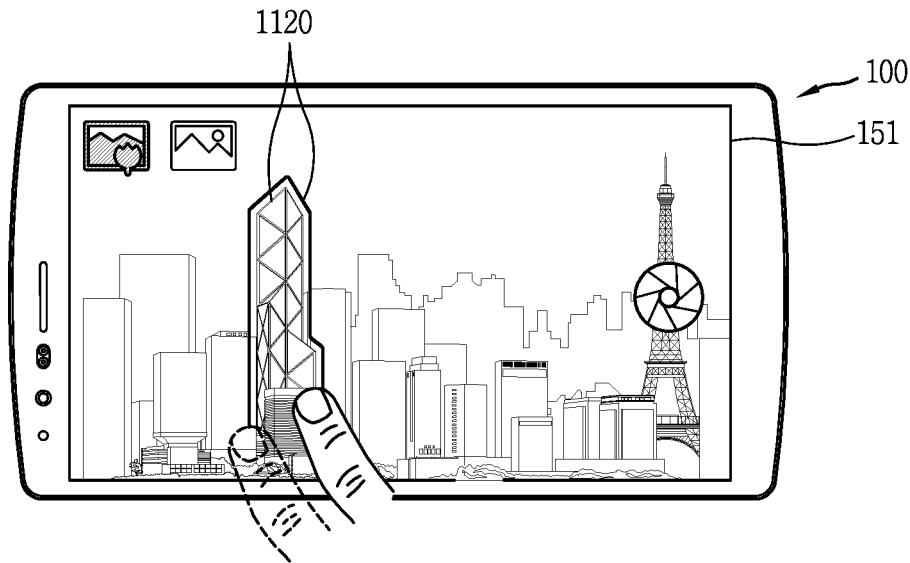

On the other hand, a subject to be captured through the second lens may be selected or specified, as illustrated in FIG. 6C, by a touch trajectory specifying a specific graphic object 1120 in the captured first image. The user may select a graphic object corresponding to a subject to be captured with a preset touch, and the control unit 180 may specify a subject according to the graphic object 1120, which is included in a touch trajectory corresponding to the selection, as the subject to be captured through the second lens.

Figure 6D:
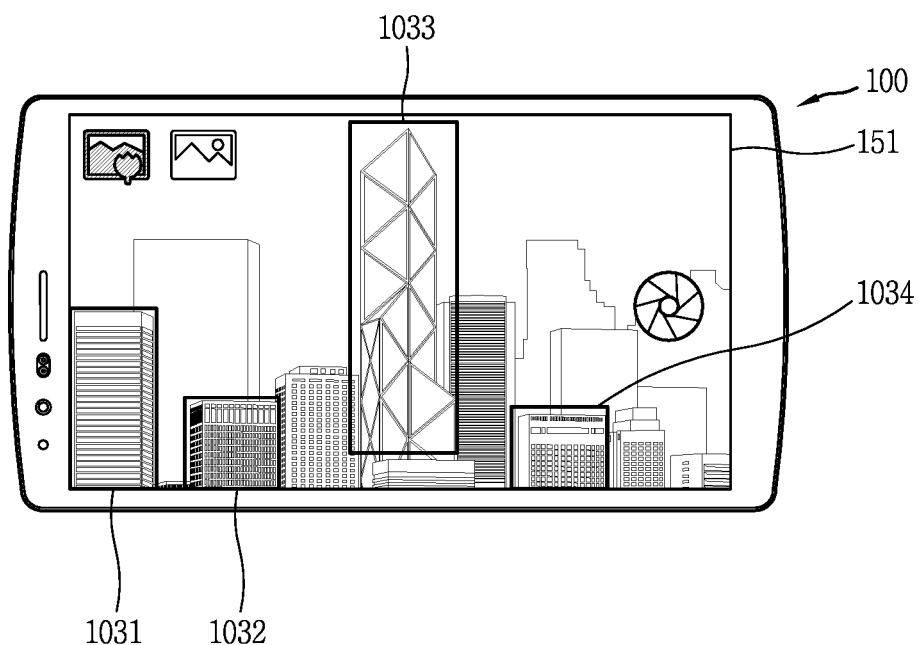

In addition, as illustrated in FIG. 6D, the control unit 180 may identify graphic objects 1031, 1032, 1033, and 1034 respectively corresponding to different subjects in the first image and display guide images (not illustrated) around the identified graphic objects 1031, 1032, 1033, and 1034, respectively. Then, when any one of the identified graphic objects 1031, 1032, 1033, and 1034 is selected by the user, the control unit 180 may specify a subject corresponding to the selected graphic object as the subject to be captured through the second lens.

Here, the graphic object identified by the control unit 180 may be a graphic object corresponding to a focused subject at the time of capturing the first image through the first lens.

Figure 7A:
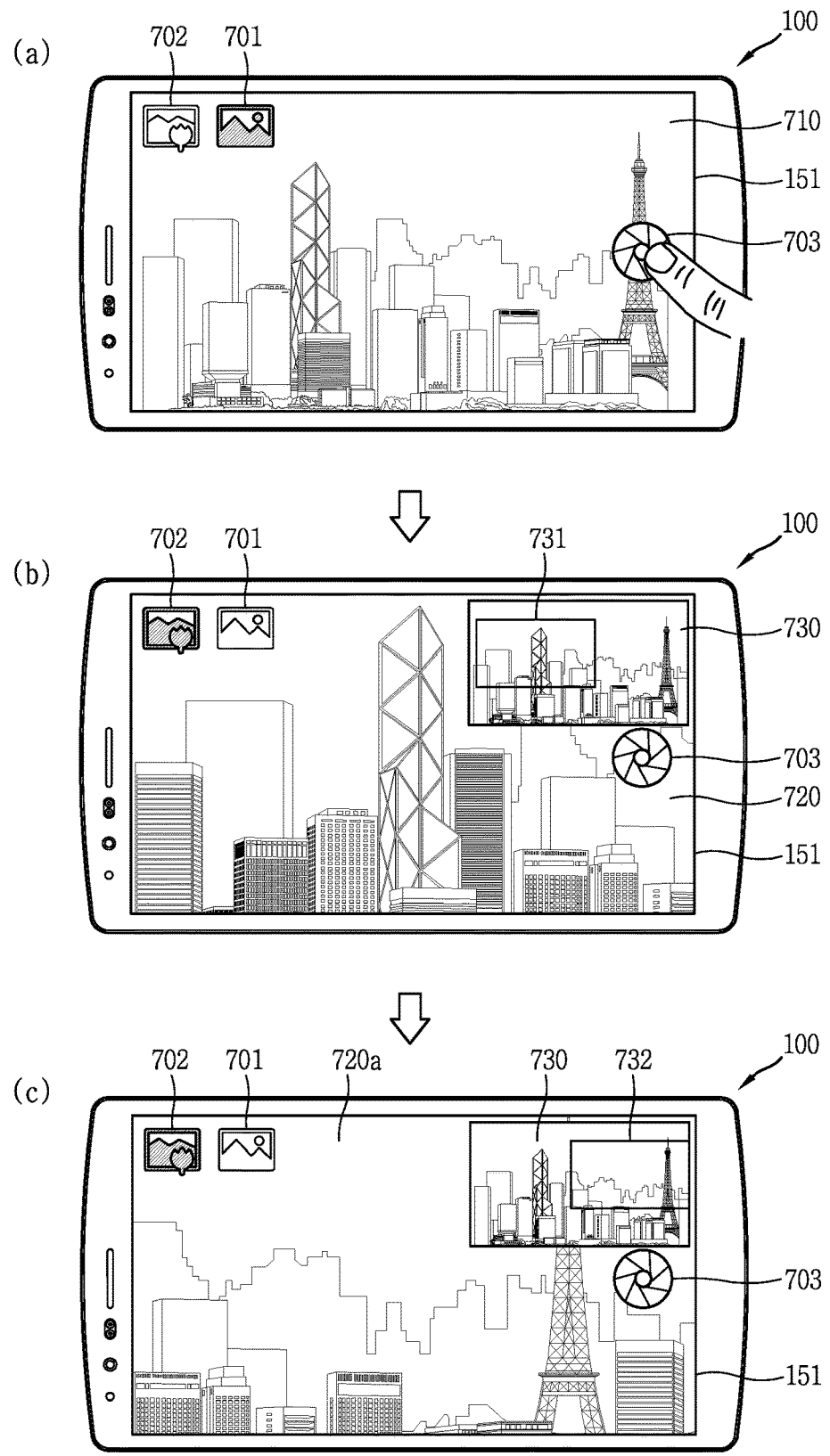

Furthermore, in the mobile terminal according to the present invention, as illustrated in (a) of FIG. 7A, when a request for capturing the first image through the first lens is received (e.g., when a capture request is received in response to a touch applied to a capture icon 703), the control unit 180 may activate the second lens based on an additional user request after performing the image capturing.

Here, the additional user request may be any of the various methods of requesting for image capturing. Further, indicators 701 and 702 for notifying which lens has been activated may be output on the touch screen 151. The control unit 180 may highlight an indicator corresponding to the currently-activated lens (for example, the first indicator 701 indicates that the first lens has been activated). The control unit may control the activation of the lenses by the selection of such an indicator. When the second indicator 702 corresponding to the second lens is selected after the first image 710 is captured through the first lens, the control unit 180 may activate the second lens and output a preview image 720, which is received through the second lens, on the touch screen 151.

At this time, the control unit 180 may match in real time the preview image received through the second lens with the first image 710 by use of at least one of the first and second matching methods. Then, the result can be displayed in the form of an image map 730, as illustrated in (b) and (c) of FIG. 7A.

The image map 730, as illustrated in FIG. 6, may be displayed using a thumbnail of the previously-captured first image 710. The control unit 180 may indicate, through the image map 730, which portion of the first image 710 a portion of the image currently received through the second lens corresponds to. In this case, a guide image 732 is output to the first image map 730, and an output portion of the guide image 732 is the portion corresponding to the image currently received through the second lens.

Figure 7B:
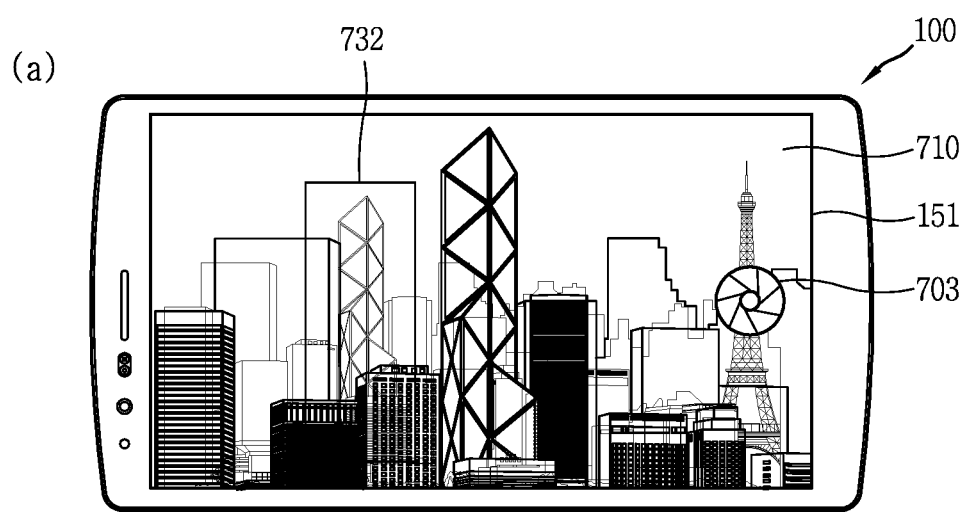
Figure 7B:
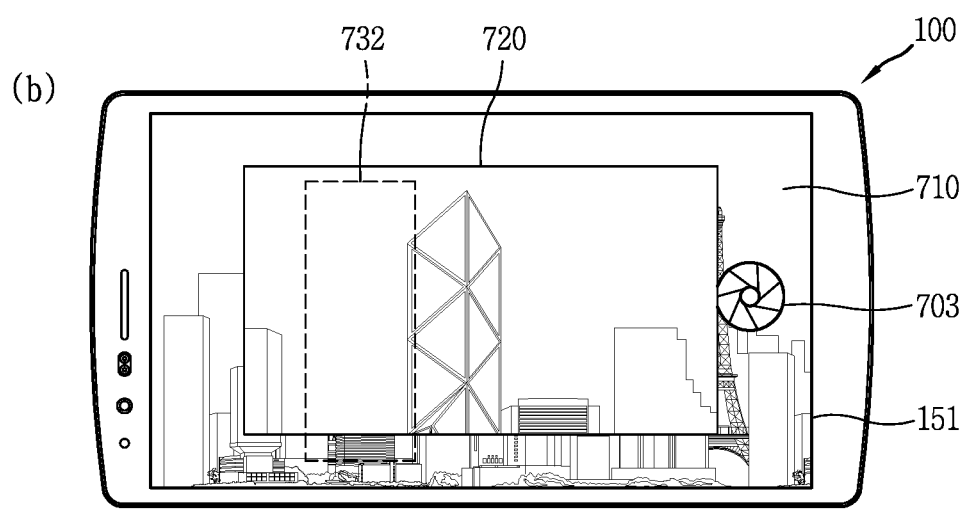
Figure 7C:
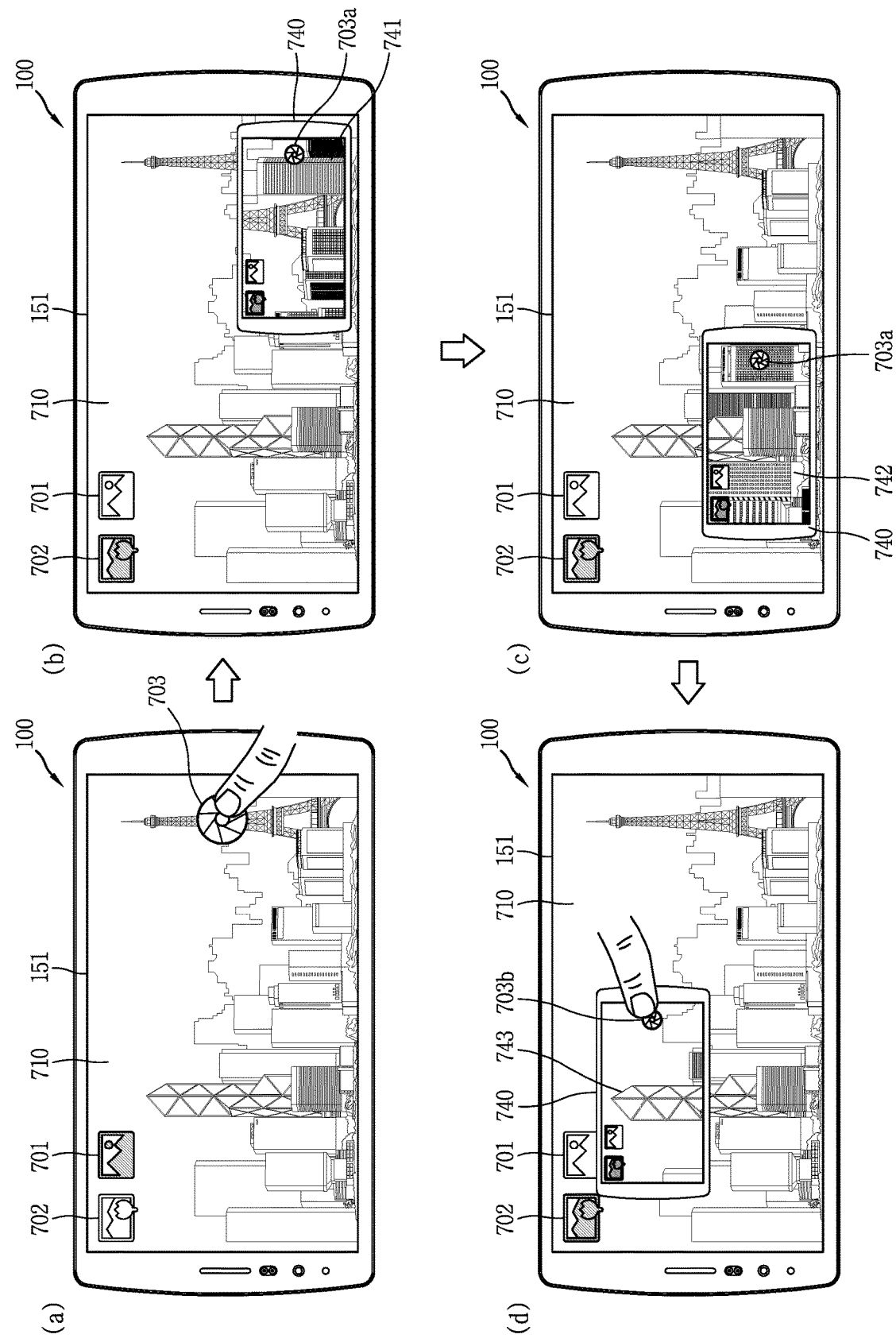

As another method, as illustrated in (a) or (b) of FIG. 7B, the control unit 180 may output the preview image 720 received through the second lens in a manner of overlapping the first image 710 while outputting the first image 710.

In this case, as illustrated in (a) of FIG. 7B, the control unit 180 may control an output size of the first image 710 before the preview image 720 is received through the second lens to be maintained as the same as that after the preview image 720 is received through the second lens. However, in this case, the control unit 180 may blur the first image by adjusting at least one of luminance, saturation, and brightness of the first image 710, so that the preview image 720 can be identified more easily. In addition, the control unit 180 may adjust transparency of the first image 710. Further, as illustrated, the control unit 180 may output the guide image 732 to at least part of the first image, to provide information indicating which portion of the first image the preview image 720 received through the second lens corresponds to.

That is, a portion where the guide image 732 is output may be a portion corresponding to the image currently being received through the second lens.

In addition, as illustrated in (b) of FIG. 7B, the control unit 180 may display the preview image 720 output through the second lens to be smaller than a display size of the first image 710. Even in this case, the control unit 180 may output, through the guide image 732, which portion of the first image the preview image 720 corresponds to.

Meanwhile, the control unit 180 may output both the first and second images in a different manner from the methods described above. First, as illustrated in (a) of FIG. 7C, when the second lens is activated after the first image 710 is captured, the control unit 180 may continuously output the first image 710 on the touch screen 151, as illustrated in (b) of FIG. 7C. As illustrated in (b), (c) and (d) of FIG. 7C, the control unit 180 may output a preview image 741, 742, 743 received through the second lens to one region of the first image 710.

Here, a position where the preview image 741, 742, 743 is output may be determined according to which portion of the first image 710 the image currently received through the second lens corresponds to.

The display size and display position of the preview image received through the second lens are determined according to which portion of the first image the image receive through the second lens corresponds to.

That is, the control unit may determine the output position and output size of the preview image received through the second lens, depending on where a subject currently being captured through the second lens is located in the first image.

Further, as illustrated, when a view of the second lens is changed, the display position and display size of the preview image 741, 742, 743 may be changed. Further, the preview image may be included in a particular image 740 (e.g., a mobile terminal image), and a capture function icon 703*b* that receives a capture request through the second lens may also be included in the particular image 740.

As described above, the preview image 741, 742, 743 may be output to a region of the first image 710, which includes a graphic object corresponding to the same subject to be captured through the first and second lenses, in an overlapping manner.

Figure 7D:
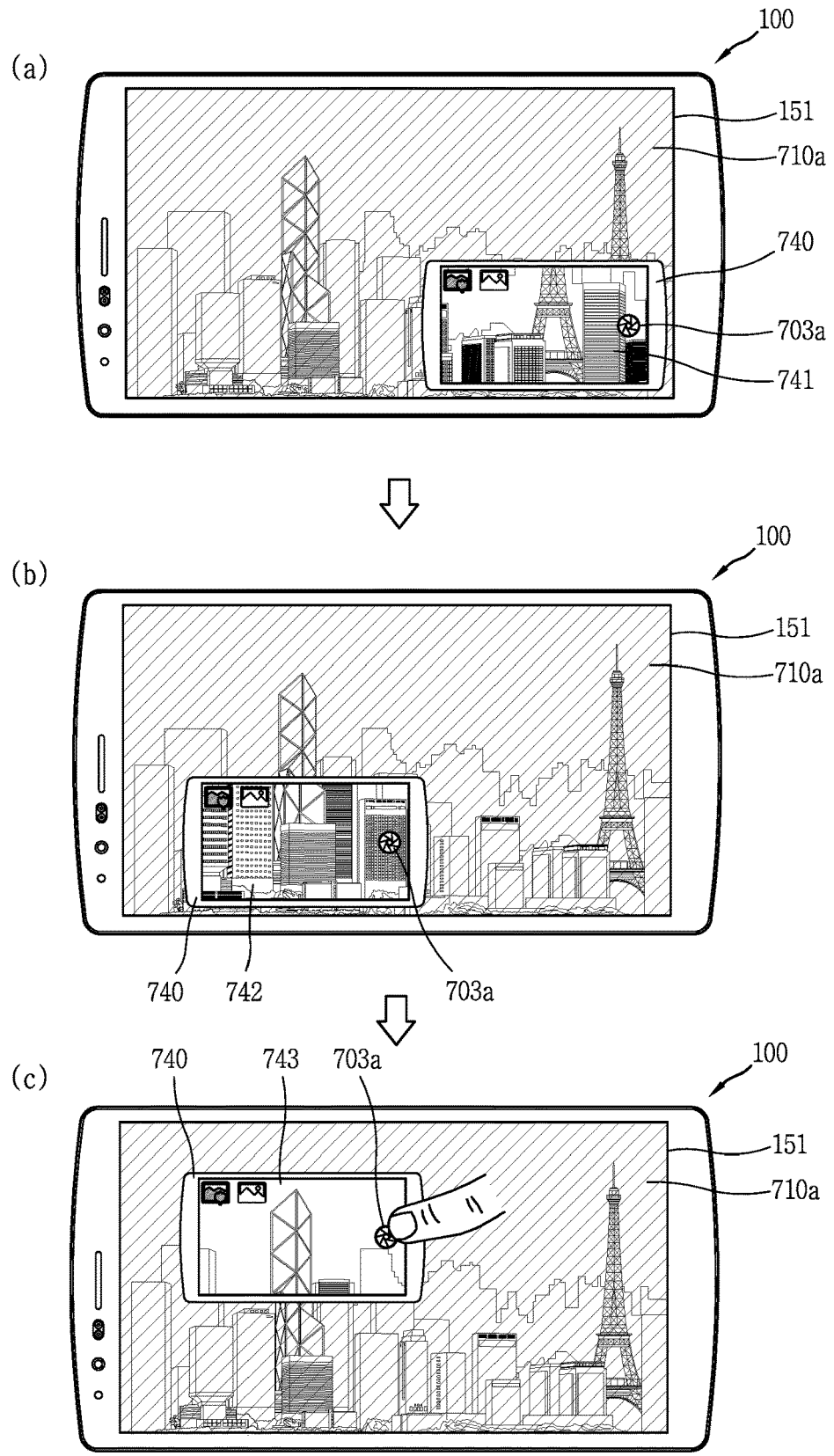

In addition, as illustrated in (a), (b), and (c) of FIG. 7D, when the first image 710 is output together with a preview image received through the second lens, the control unit 180 may change visual appearance of the first image 710, so that the preview image 741, 742, 743 can be identified more easily. The control unit 180 may display the first image 710 differently from its unique visual appearance, for example, display the first image 710 in black and white, adjust transparency of the first image 710, or change a color of the first image 710.

The foregoing embodiment has illustrated the case where the first lens is activated, the first image is captured and the second lens is activated. However, the present invention may also be applied to a case where both the first and second lenses are activated.

Figure 8A:
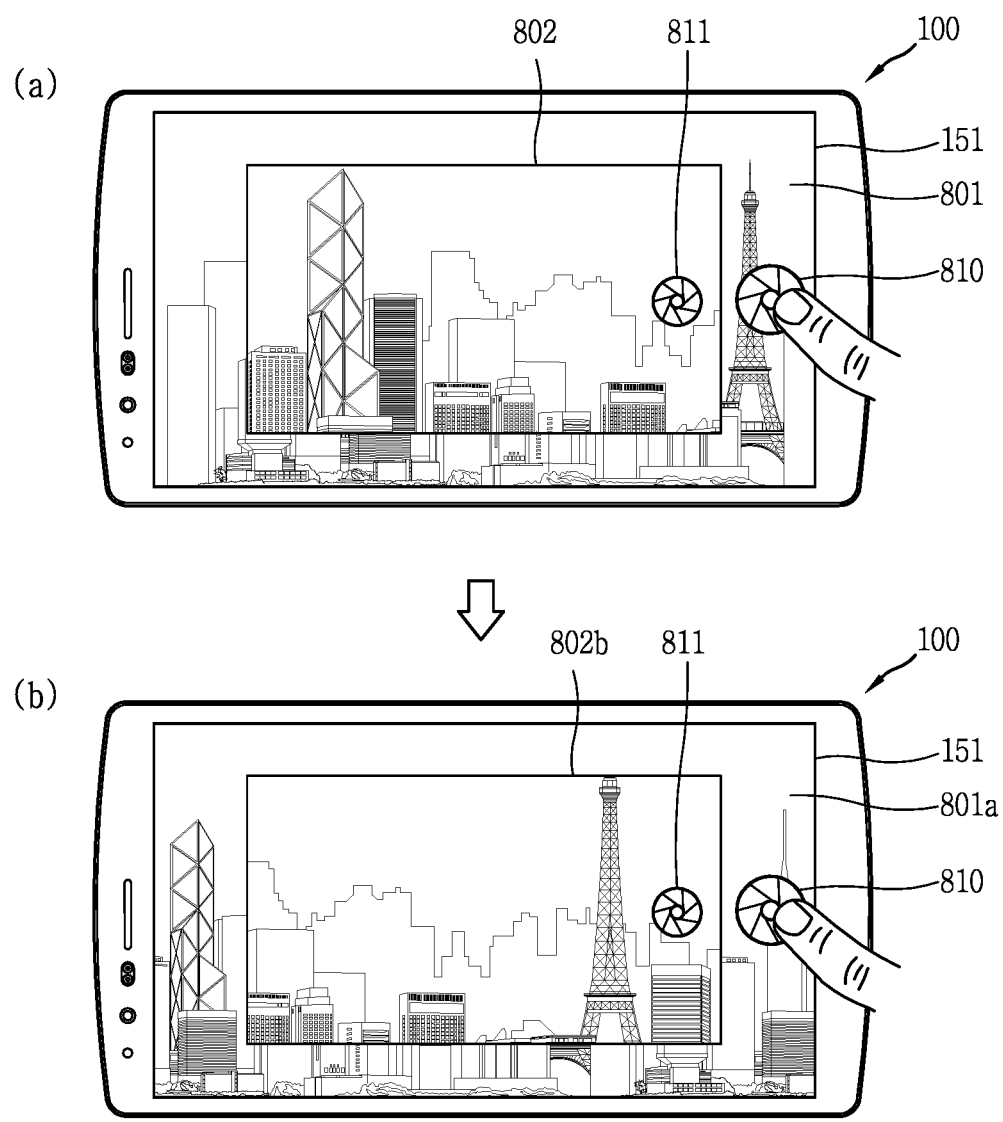

In this case, as illustrated in (a) and (b) of FIG. 8A, preview images 801 and 802 respectively received through the first and second lenses may be output together on the touch screen 151.

At this time, an output position of the preview image 802 received through the second lens is determined depending on where a common subject to be captured through the first and second lenses is located.

That is, an image of a portion corresponding to a subject to be commonly captured through the first and second lenses may be displayed by use of any one of preview images received through the first and second lenses.

On the other hand, capture commands through the first and second lenses may be independently received through first and second capture function icons 810 and 811, which are separate from each other. Furthermore, the capture commands through the first and second lenses may be received simultaneously through preset touches applied to the first and second capture function icons 810 and 811.

Further, the capture commands through the first and second lenses may be applied through different capture function icons from the first and second capture function icons 810 and 811 or separate algorithms.

Figure 8B:
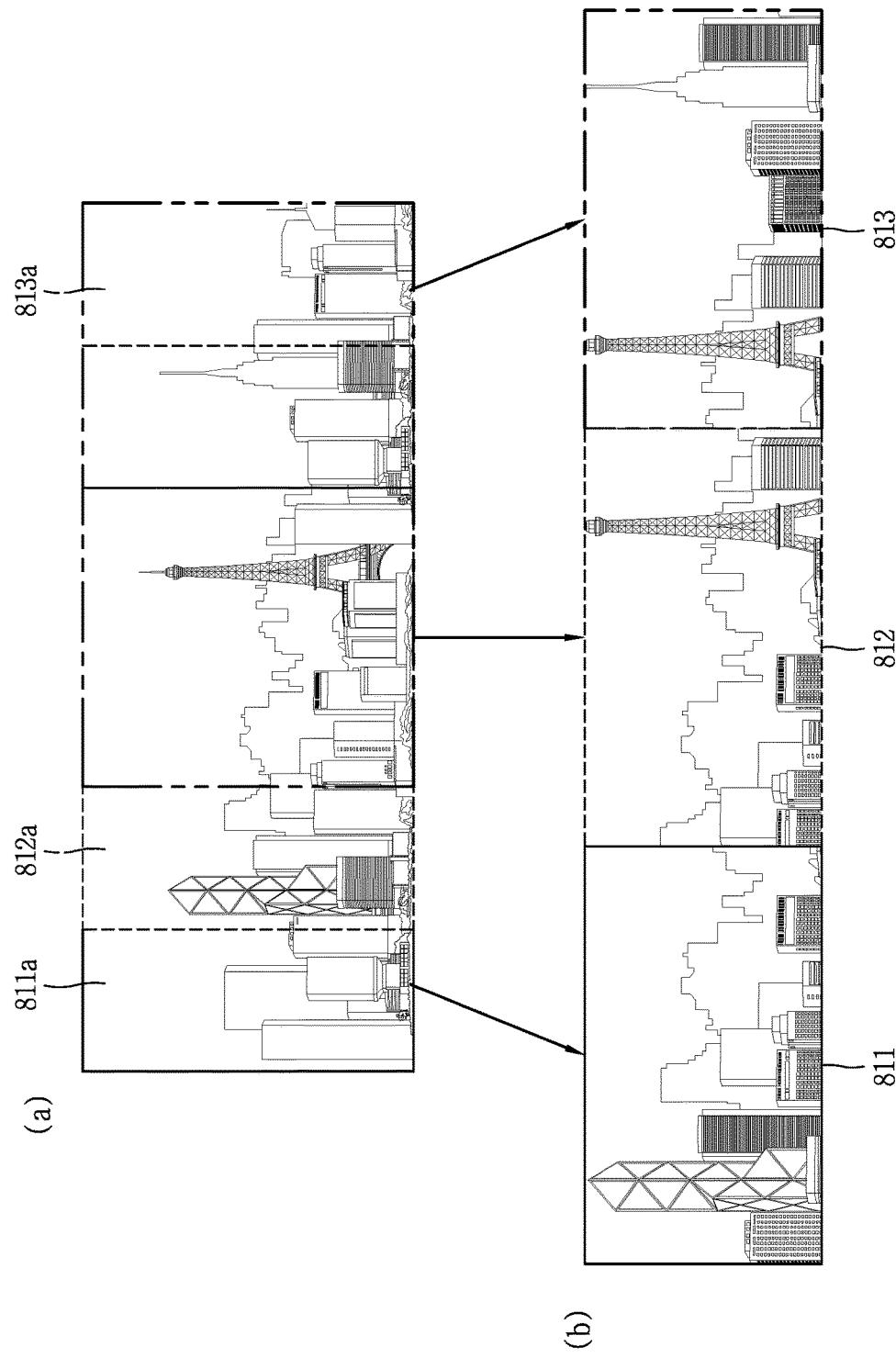

Further, when a plurality of images is simultaneously captured through the first and second lenses, the control unit 180, as illustrated in (b) of FIG. 8B, may generate one panoramic image by merging the plurality of images 811, 812, and 813 captured through the first lens. Similarly, the control unit 180 may generate one panoramic image by merging a plurality of images 811*a*, 812*a*, and 813*a* captured through the second lens. On the other hand, when a portion correlated with the second image is selected from the merged panoramic image captured through the first lens, the control unit 180 may output an image corresponding to the selected portion from the plurality of images 811*a*, 811*a*, 813*a* captured through the second lens, or output the merged panoramic image captured through the second lens.

Hereinafter, description will be given in more detail of a method of providing a second image correlated with a first image to a user after the first and second images are correlated with each other, with reference to the accompanying drawings. FIGS. 9A, 9B, 9C, 9D, 9E, 9F, 9G and 9H are conceptual views illustrating a method of guiding a user to recognize presence of images captured through lenses having different telephoto ratios.

Figure 9A:
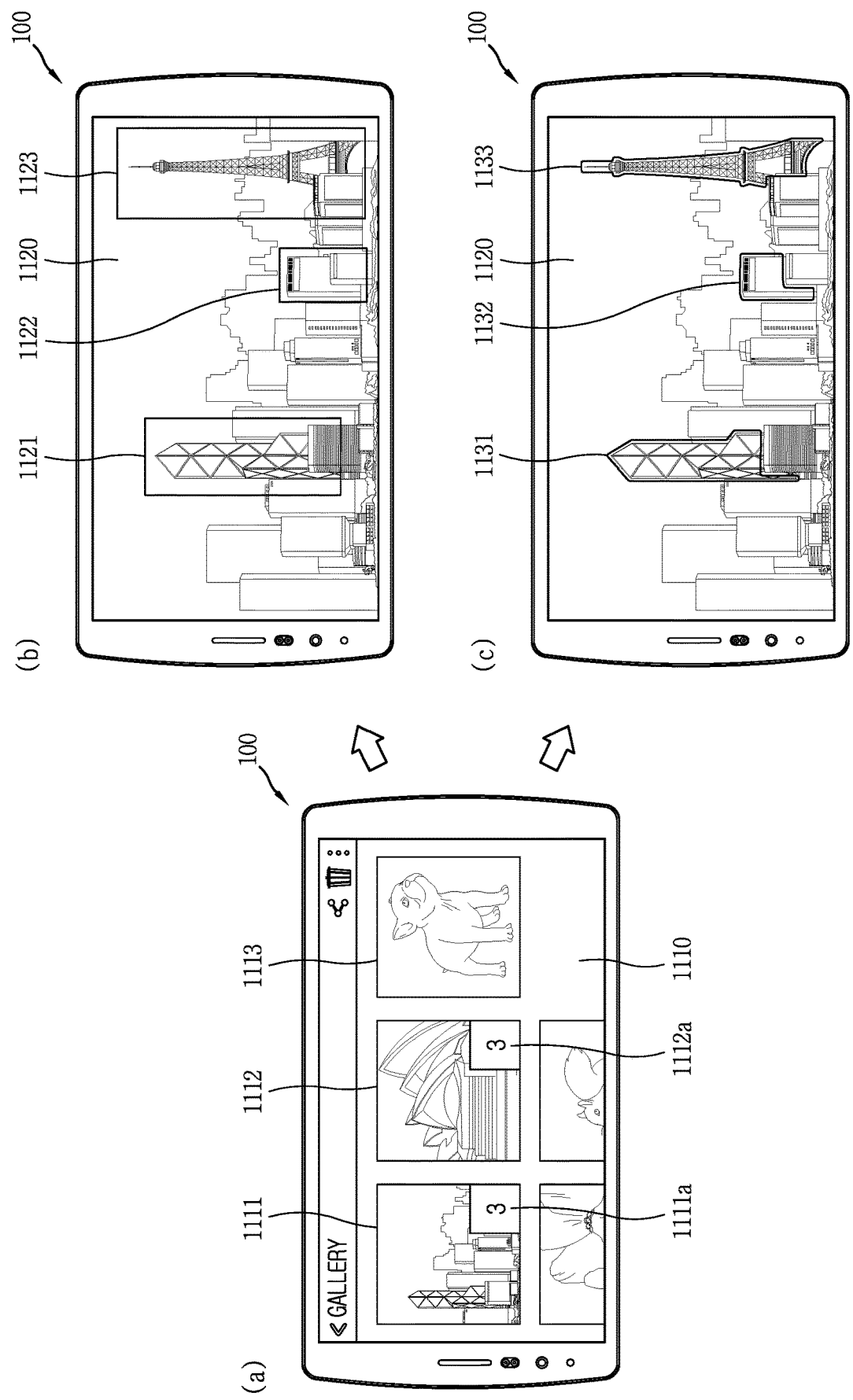
FIGS. 9A, 9B, 9C, 9D, 9E, 9F, 9G and 9H are conceptual views illustrating a method of guiding a user to recognize presence of images captured through lenses having different telephoto ratios.

In the mobile terminal according to the present invention, when a list of captured images or thumbnail images 1111, 1112, 1113 (see (a) of FIG. 9A) are output in a gallery function application which provides an alarm for a captured image, the control unit 180 may output indicators 1111*a* and 1112*a* indicating presence of correlated second images on the first images 1111 and 1112 which have the correlated second images.

As illustrated, the indicators 1111*a* and 1112*a* may include information related to the number of correlated second images. That is, the control unit 180 may provide information related to the second image correlated with the first image, together with information related to the first image.

Figure 9B:
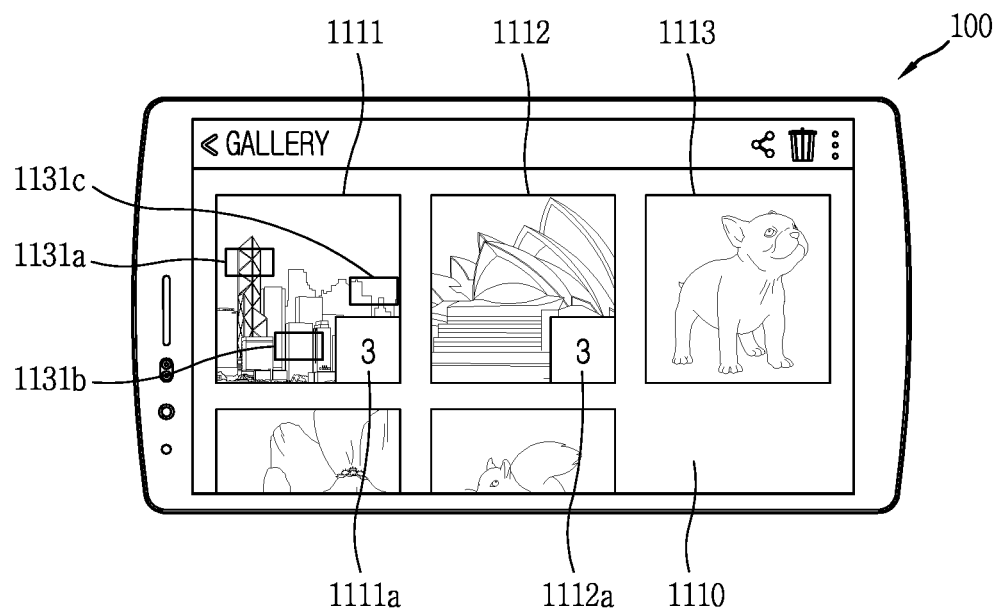

Also, as illustrated in FIG. 9B, the control unit 180 may output guide images 1131*a*, 1131*b*, and 1131*c*, which indicate portions correlated with the second images, on the thumbnail image 1111, 1112, 1113. For example, when a first image corresponding to the first thumbnail image 1111 is correlated with three second images, the control unit 180 may indicate, on the thumbnail image, portions of the first image which are correlated with the second images. Accordingly, guide images 1131*a*, 1131*b*, and 1131*c* may be output to positions corresponding to the portions of the first image which are correlated with the second images, in the first thumbnail image 1111.

The shape and display ratio of the guide image may correspond to an aspect ratio of the second lens that has captured the second image. For example, if the second lens has an aspect ratio of 16:9, the guide image may be in a rectangular shape with a ratio of 16:9.

In addition, in a state where the first image is correlated with at least one second image, as illustrated in (b) or (c) of FIG. 9A, when the first image is displayed on the touch screen 151, the control unit 180 may output a guide image, which indicates the presence of the correlated second image, on a region 1121, 1122, 1123, 1131, 1132, 1133 of the first image 1120, which are correlated with the second image.

The guide image, as illustrated in (b) and (c) of FIG. 9A, may be output based on objects included in the first image 1120.

Figure 9C:
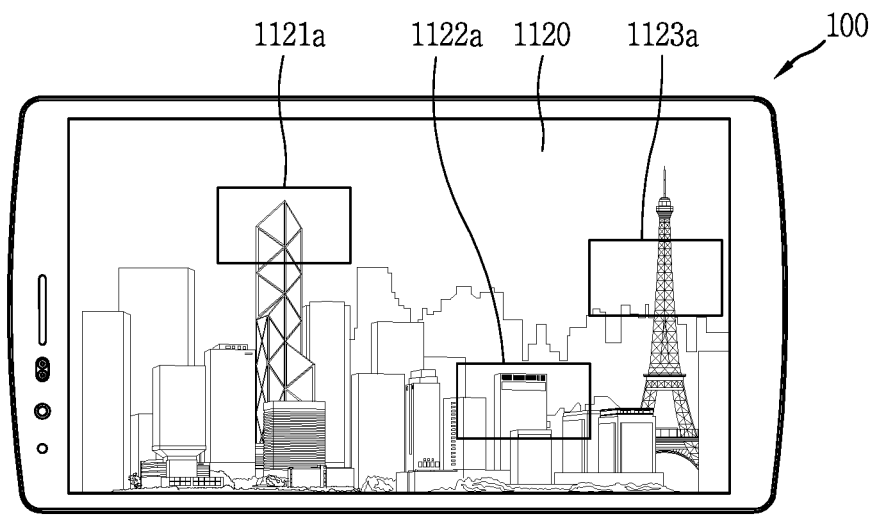

As illustrated in FIG. 9C, the control unit 180 may output the guide image 1141, 1142, 1143 in a shape corresponding to the aspect ratio of the second lens, which has captured the second image, not based on an object. For example, if the second lens has an aspect ratio of 16:9, the guide image may be in a rectangular shape with a ratio of 16:9.

Meanwhile, when the output portion of the guide image is touched, the control unit 180 may output a second image correlated with the touched portion on the touch screen 151.

Figure 9D:
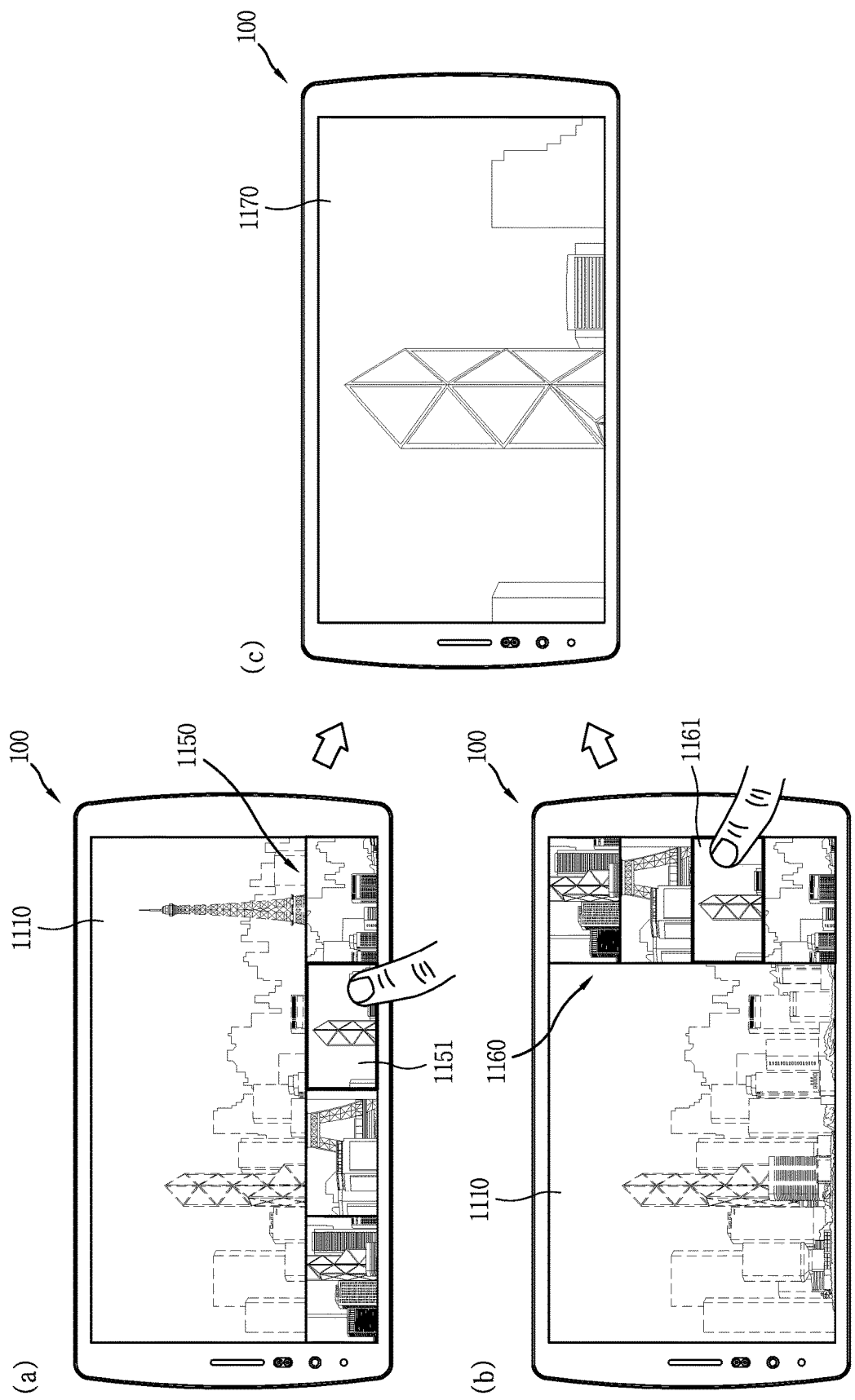

As another example, as illustrated in (a) and (b) of FIG. 9D, when the first image 1110 is output, the control unit 180 may output at least one thumbnail image 1150, 1160 of the second image correlated with the first image 1110 on one region of the touch screen 151.

As illustrated in (a) of FIG. 9D, the control unit may output the thumbnail image 1150 of the second image to overlap at least part of the first image 1110. Or, as illustrated in (b) of FIG. 9D, the control unit 180 may output the first image 1110 to one region and output the thumbnail image 1160 of the second image to another region which does not overlap the one region.

When any one of the at least one thumbnail image 1150, 1160 is selected, as illustrated in (c) of FIG. 9D, the control unit 180 may output a second image 1170 corresponding to the selected thumbnail image to the touch screen 151.

Figure 9E:
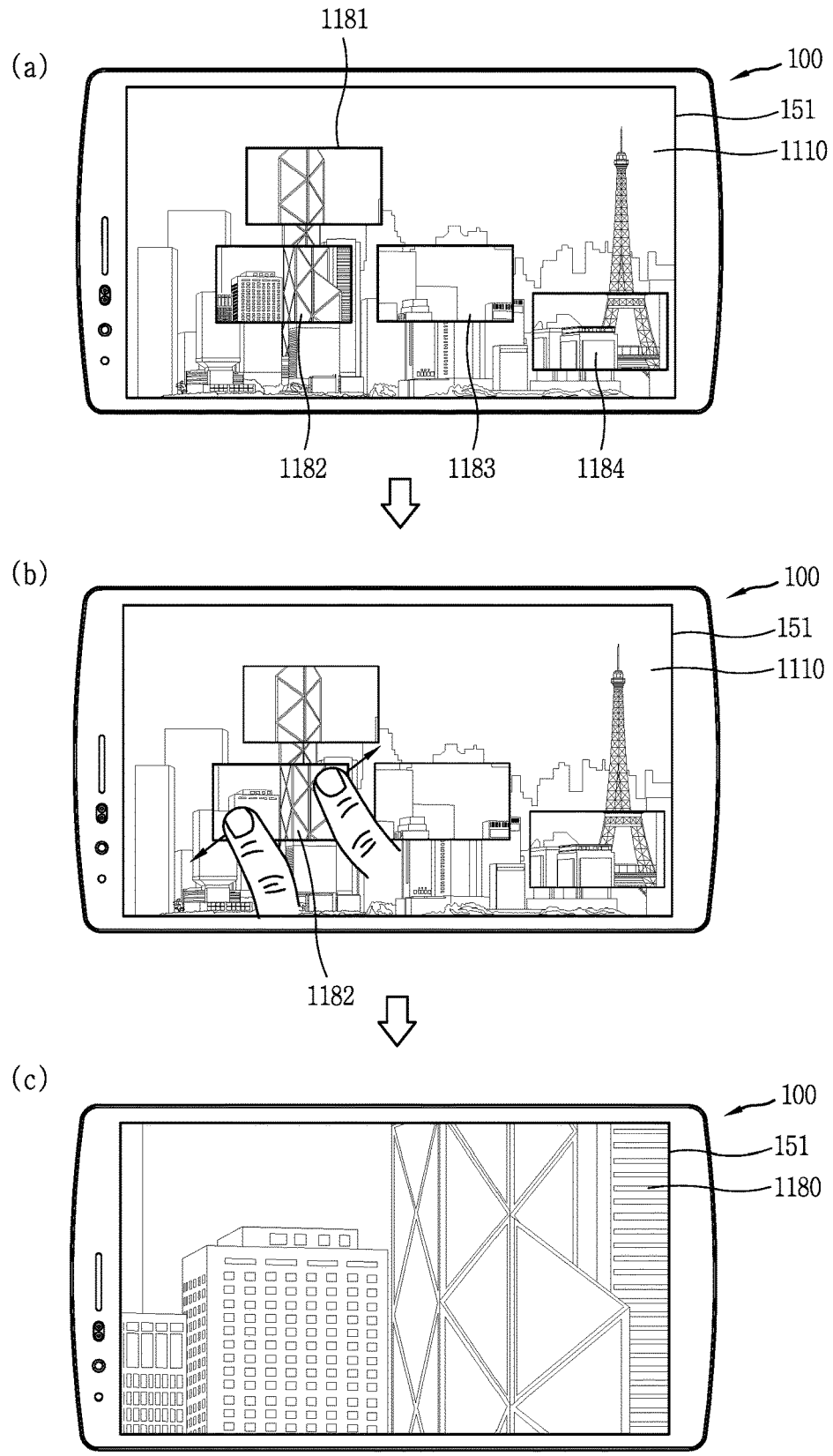
Figure 9F:
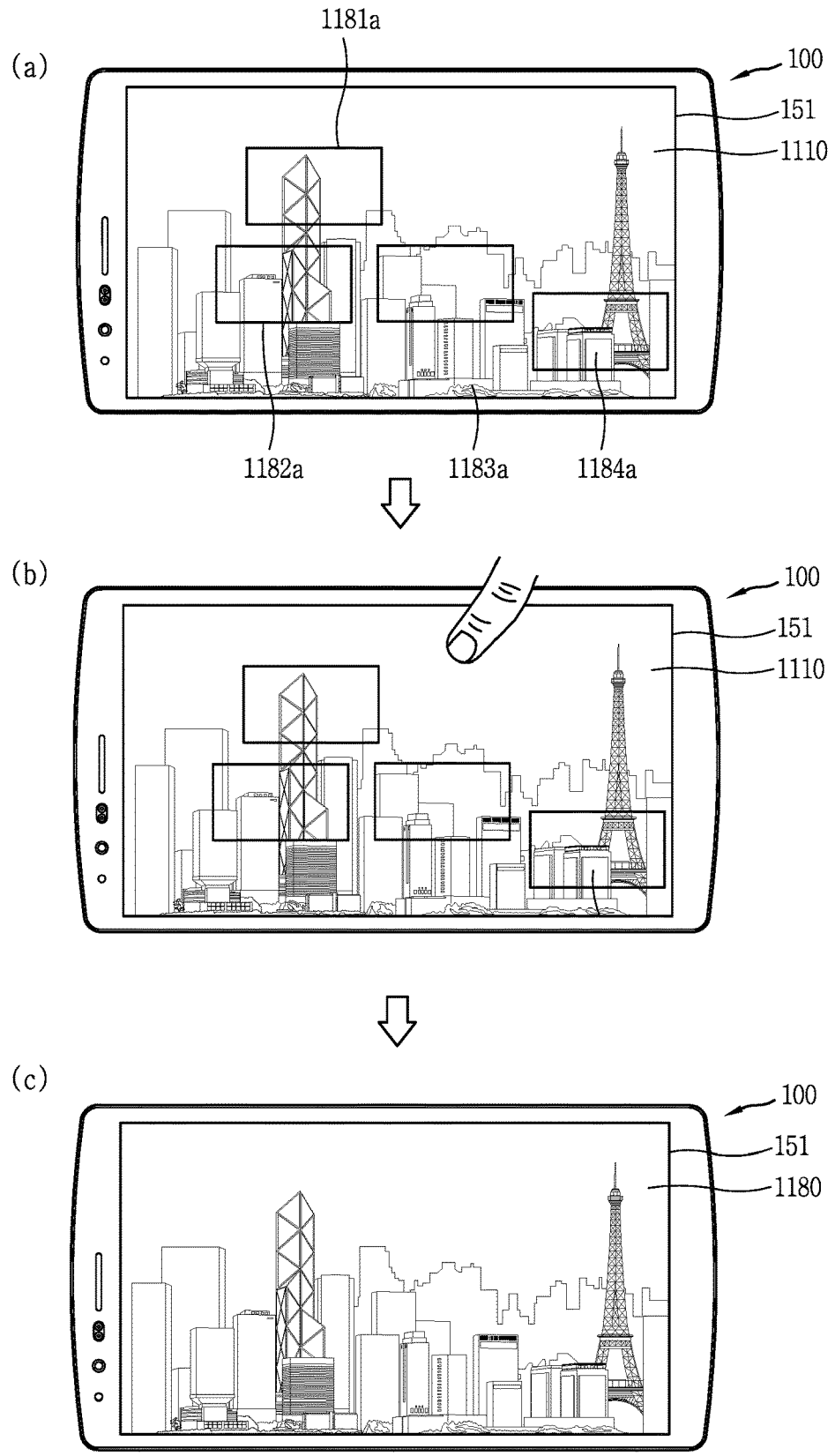

As another example, as illustrated in (a) of FIGS. 9E and 9F, when a second image is correlated with at least one region 1181, 1182, 1183, 1184, 1181*a*, 1182*a* 1183*a*, 1184*a* of the first image 1110, the control unit 180 may output a guide image to each of the at least one region 1181, 1182, 1183, 1184, 1181*a*, 1182*a* 1183*a*, 1184*a* to indicate that the second image is correlated to the at least one region.

This guide image may be displayed in a thumbnail format of the second image, as illustrated in FIG. 9E. In this case, a display position of the thumbnail image corresponding to the second image may be a region of the first image, with which the second image is correlated.

On the other hand, as illustrated in (b) of FIG. 9E, when a preset touch is applied to one (e.g., 1182) of the at least one region, the control unit 180, as illustrated in (c) of FIG. 9E, may output a second image 1180 correlated with the one region 1182.

In this case, the preset touch may be a pinch-in touch for enlarging the display size of the first image. The control unit 180 may gradually enlarge the display size of the first image according to the pinch-in touch. When an enlarged degree of the first image exceeds a preset reference, the control unit 180 may control the touch screen to output the second image 1180 correlated with the region 1182 to which the pinch-in touch has been applied.

In addition, although not shown, in a state where the second image 1180 is output in response to the pinch-in touch, when a pinch-out touch for reducing a display size of the second image 1180 is applied, the control unit 180 may control the touch screen to output the first image 1110 again.

As another example, as illustrated in (a) of FIG. 9F, the control unit may display a rectangular guide image to a region 1181*a*, 1182*a*, 1183*a*, 1184*a*, which is correlated with the second image, in the first image 1110. In this case, the guide image may be output in a shape corresponding to an aspect ratio of the second lens, which has captured the second image. For example, if the second lens has an aspect ratio of 16:9, the guide image may be rectangular in shape with a ratio of 16:9.

On the other hand, these guide images, as illustrated in (b) and (c) of FIG. 9F, may disappear from the touch screen when a preset touch is applied to a region without any guide image. This is to prevent the guide image from obscuring the first image.

Further, when the preset touch is applied to the touch screen again, the control unit 180 may output the guide image again.

In addition, in the present invention, the second image can be output together with the first image in a different manner from the method of outputting the second image by the pinch-in or pinch-out touch applied to the output region of the guide image.

Figure 9G:
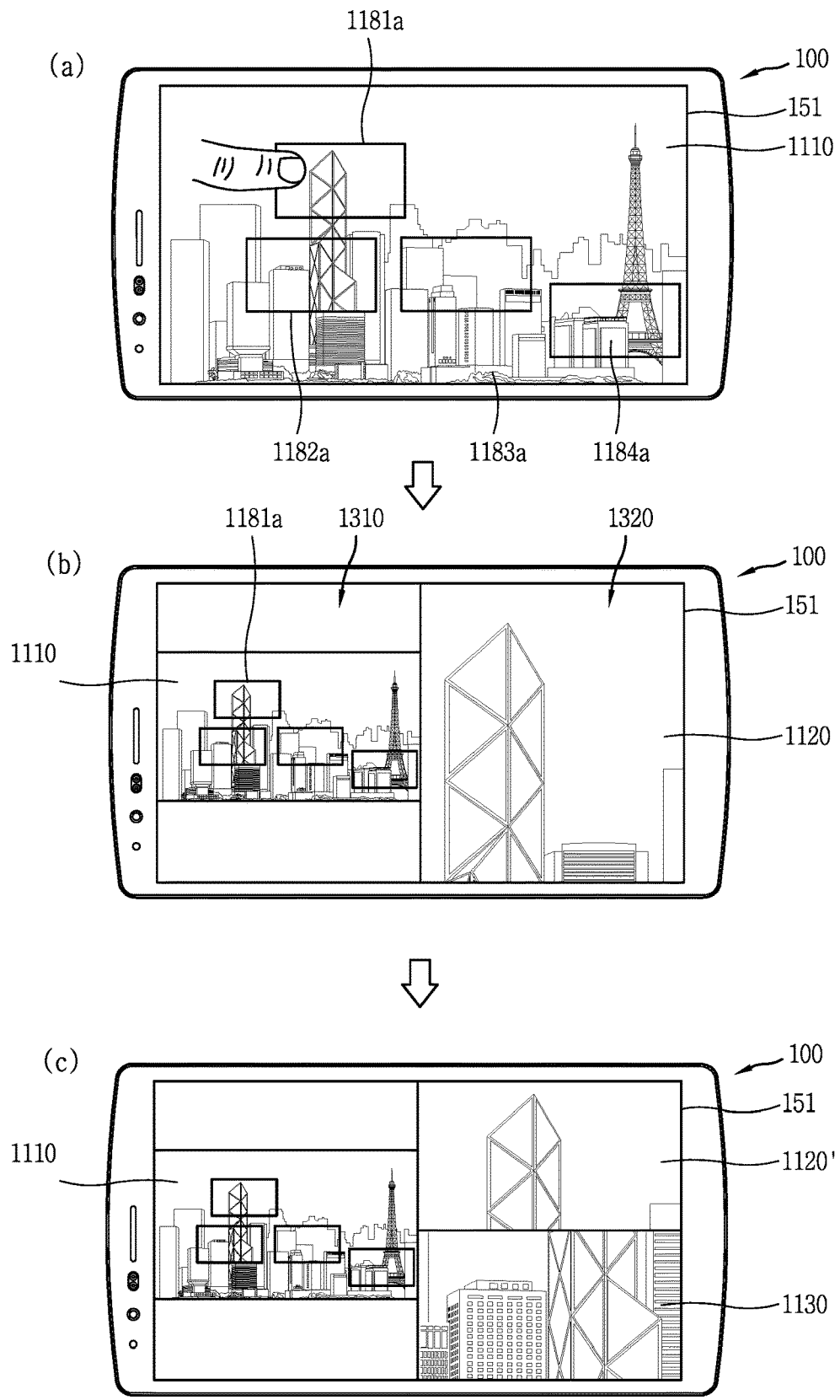

For example, as illustrated in (a) of FIG. 9G, when a preset touch (e.g., a short touch, a long touch, a double touch, etc.) is applied to one of regions 1181, 1182, 1183, and 1184 to which the guide images are output, the control unit 180, as illustrated in (b) of FIG. 9G, may segment the touch screen into a plurality of regions (e.g., two regions 1310 and 1320). The control unit 180 may output the first image 1110 to one of the plurality of regions, and the second image 1120 correlated with a region, to which the preset touch has been applied, to another region.

Meanwhile, the control unit may adjust sizes of the segmented regions along a dragged direction, in response to a drag touch starting from one of the segmented regions. As the sizes of the regions are adjusted, display sizes of the images output on the corresponding regions may also be adjusted.

In addition, when a preset touch is further applied to the another region, which is correlated with the second image, in the first image 1110 output to the one region 1310, the control unit may additionally segment the another region 1320 where the second image is output.

In addition, the control unit may output the second image, which was displayed before segment, on one segmented region 1120', and output the second image correlated with an additionally selected region in the another region 1130.

On the other hand, when a preset touch is applied again to the another region, which is correlated with the second image, in the first image output on the one region, the control unit 180 may output a second image correlated with the newly-selected region, instead of the second image output on the another region.

Figure 9H:
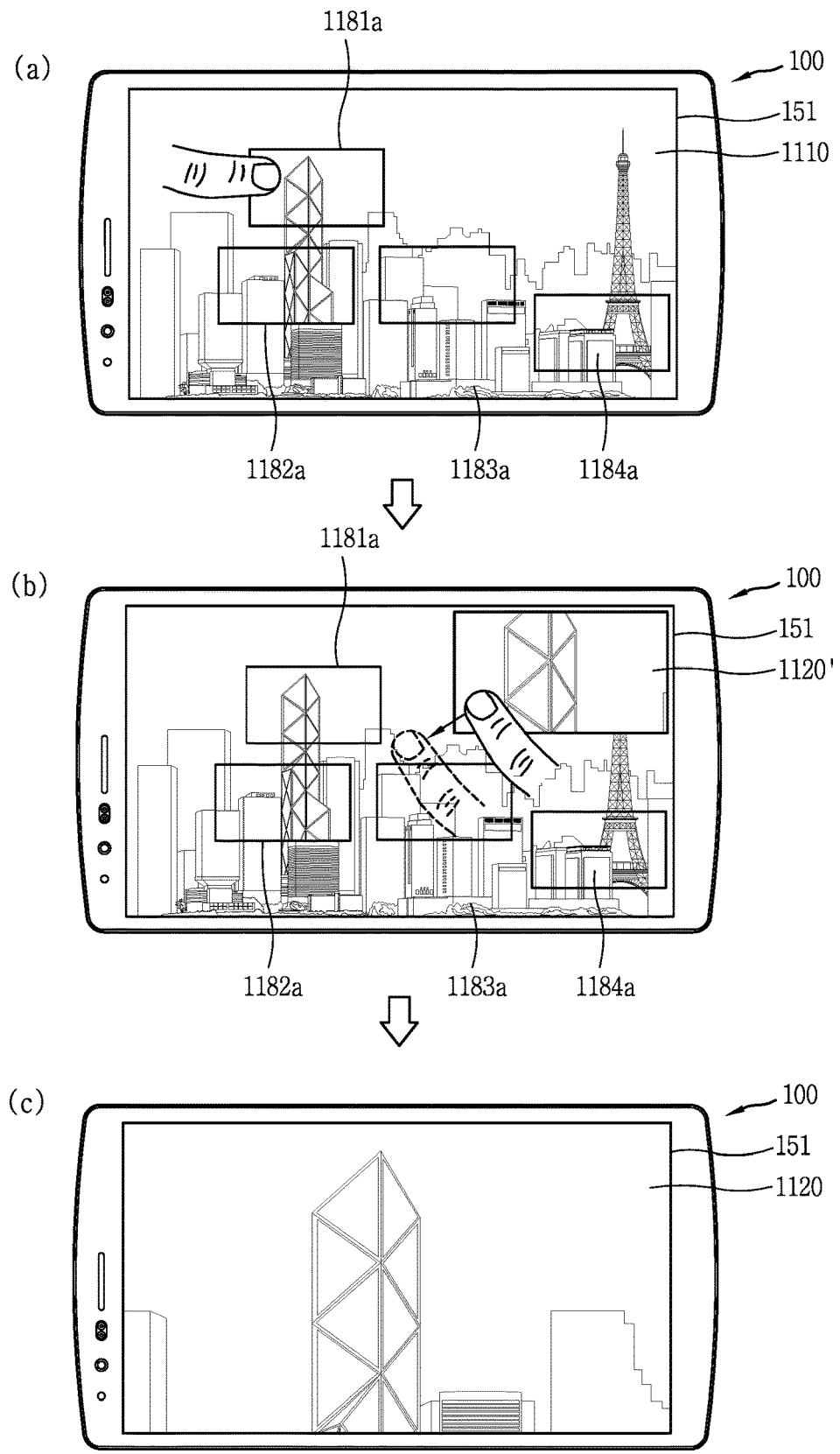

As another example, as illustrated in (a) of FIG. 9H, when a preset touch (e.g., a short touch, a long touch, a double touch, etc.) is applied to one of output regions 1181a, 1182a, 1183a, and 1184a of guide images, the control unit 180, as illustrated in (b) of FIG. 9H, may output a pop-up window 1120' to one region of the first image, and output a second image corresponding to a newly-selected region to the output pop-up window. At least one of an output size and an output position of this pop-up window may be changed based on a touch (e.g., a drag touch) applied to the pop-up window.

On the other hand, when a touch length of a touch (for example, a drag touch) for enlarging the pop-up window corresponds to a preset reference, the control unit, as illustrated in (c) of FIG. 9H, may terminate the output of the first image and output the entire second image 1120 on the touch screen.

As described above, in a mobile terminal according to the present invention, by providing a second image together with a first image in various manners, an image with high resolution can be intuitively provided with respect to a user-interested region, even if the user does not search for the second image separately.

As described above, according to a mobile terminal and a control method of the present invention, it is possible to capture images using a plurality of lenses having different telephoto ratios, and correlate the captured images with each other with respect to a specific subject. Therefore, images having different telephoto ratios for the specific object can be provided.

In addition, one of a plurality of lenses having different telephoto ratios has a telephoto ratio of 1 or less, and thus can acquire an enlarged image for a specific subject. Therefore, in a mobile terminal and a control method thereof according to the present invention, an enlarged image for a subject corresponding to a portion selected by a user in an image captured through a lens having a telephoto ratio of 1 or more can be provided as the image captured through the lens having the telephoto ratio of 1 or more, which may allow the user to acquire an enlarged image with high quality with respect to the specific subject.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A mobile terminal, comprising:
   a terminal body;
   a touch screen;
   a camera provided in the terminal body and including first and second lenses having different telephoto ratios; and
   a control unit to correlate a first image captured through the first lens and a second image captured through the second lens with each other, with respect to a specific subject,
   wherein the control unit,
   correlates a first region of the first image including a first graphic object corresponding to the specific object with a second image including a second graphic object corresponding to the specific object, and
   controls the touch screen to output the second image when a preset touch is applied to the first region of the first image in a state where the first image is output on the touch screen,
   wherein the control unit is further configured to:
   when the second image is captured through the second lens corresponding to a telephoto lens after the first image is captured, extract the first and second graphic objects corresponding to the specific object from each of the first image and the second image, by using feature points of graphic objects included in the first image and the second image, and specify, as the first region, a region of the first image which corresponds to the second graphic object included in the second image and includes the first graphic object.

2. The terminal of claim 1, wherein the first lens is a lens having a telephoto ratio greater than or equal to 1, and the second lens is the telephoto lens having a telephoto ratio smaller than 1.

3. The terminal of claim 2, wherein the control unit extracts the first and second images satisfying a common capturing condition among a plurality of images respectively captured through the first and second lenses, and determines a region of the first image, with which the second image is to be correlated, through a preset image matching process with respect to the first and second images.

4. The terminal of claim 3, wherein the common capturing condition includes a capturing place condition and a capturing time condition.

5. The terminal of claim 3, wherein the control unit extracts relative movement information related to the terminal body at a second time point with respect to a first time point by comparing posture information related to the terminal body at the first time point at which the first image has been captured with posture information related to the terminal body at a second time point at which the second image has been captured, and
performs the first image matching process of determining the region of the first image, with which the second image is to be correlated, by use of the extracted relative movement information of the terminal body.

6. The terminal of claim 5, wherein the first region is determined as a region located apart from a reference region of the first image by the relative movement information related to the terminal body, during the first image matching process.

7. The terminal of claim 1, wherein the control unit extracts the feature points of the graphic objects included in the first image and the second image, based on a preset algorithm.

8. The terminal of claim 2, wherein the control unit, when an image capture request through the second lens corresponding to the telephoto lens is received after the first image is captured through the first lens,
outputs both the previously-captured first image and a preview image received through the second lens on the touch screen.

9. The terminal of claim 8, wherein a display size and a display position of the preview image received through the second lens are determined according to a display position and a display size of the first graphic object, which corresponds to the specific subject to be captured through the second lens, in the first image.

10. The terminal of claim 9, wherein the preview image is overlapped on the first region including the first graphic object in the first image.

11. The terminal of claim 8, wherein the image capture request through the second lens corresponding to the telephoto lens is received in response to a preset touch being applied to one of at least one graphic object included in the first image output on the touch screen.

12. The terminal of claim 11, wherein the control unit activates the second lens corresponding to the telephoto lens, in response to the preset touch, and controls the camera so that the second lens is focused on a subject corresponding to the one graphic object to which the preset touch has been applied.

13. The terminal of claim 1, wherein the control unit, when the first image is output on the touch screen in a state where the first region of the first image and the second image are correlated with each other,
controls the touch screen to output a guide image indicating that the second image is correlated with the first region.

14. The terminal of claim 1, wherein the preset touch is a pinch-in touch for enlarging a display size of the first image, and
wherein the control unit gradually enlarges a display size of the first image according to the pinch-in touch, and controls the touch screen to output the second image instead of the first image when an enlarged degree of the first image exceeds a preset reference.

15. The terminal of claim 14, wherein the control unit controls the touch screen to output the first image again when a pinch-out touch for reducing a display size of the second image is applied in a state where the second image is output in response to the pinch-in touch.

16. A mobile terminal, comprising:
a terminal body;
a touch screen;
a camera provided in the terminal body and including first and second lenses having different telephoto ratios; and
a control unit to:
extract a first image captured through the first lens and a second image captured through the second lens, which satisfy a common capturing condition, from a plurality of images captured through the first and second lenses, respectively, and
correlate the first image and the second image with each other, with respect to a specific subject,
wherein the control unit,
correlates a first region of the first image including a first graphic object corresponding to the specific object with a second image including a second graphic object corresponding to the specific object, and
controls the touch screen to output the second image when a preset touch is applied to the first region of the first image in a state where the first image is output on the touch screen,
wherein the control unit is further configured to:
when the second image is captured through the second lens corresponding to a telephoto lens after the first image is captured, extract the first and second graphic objects corresponding to the specific object from each of the first image and the second image, by using feature points of graphic objects included in the first image and the second image, and specify, as the first region, a region of the first image which corresponds to the second graphic object included in the second image and includes the first graphic object.

17. The mobile terminal of claim 16, wherein the common capturing condition includes at least one of a capturing place condition and a capturing time condition.

* * * * *